United States Patent [19]

Murata et al.

[11] Patent Number: 5,553,208
[45] Date of Patent: Sep. 3, 1996

[54] IMAGE SYNTHESIZING SYSTEM HAVING A FIELD BUFFER UNIT THAT STORES TEXTURE COORDINATES

[75] Inventors: Hiroyuki Murata, Tokyo; Takashi Yokota, Yokohama, all of Japan

[73] Assignee: Namco Ltd., Tokyo, Japan

[21] Appl. No.: 211,395

[22] PCT Filed: Aug. 26, 1993

[86] PCT No.: PCT/JP93/01206

§ 371 Date: Apr. 1, 1994

§ 102(e) Date: Apr. 1, 1994

[87] PCT Pub. No.: WO94/04990

PCT Pub. Date: Mar. 3, 1994

[30] Foreign Application Priority Data

Aug. 26, 1992 [JP] Japan ..................... 4-252139

[51] Int. Cl.⁶ .................................................. G09B 9/08
[52] U.S. Cl. ............................................ 395/125; 395/130
[58] Field of Search ............................ 395/119, 121, 395/123, 125, 127, 134, 118, 130

[56] References Cited

U.S. PATENT DOCUMENTS

| | | | |
|---|---|---|---|
| 3,887,763 | 6/1975 | Hinoshita et al. | 348/425 |
| 3,889,107 | 6/1975 | Sutherland | 395/125 |
| 4,594,673 | 6/1986 | Holly | 395/121 |
| 4,615,013 | 9/1986 | Yan et al. | 395/130 |
| 4,682,217 | 7/1987 | David et al. | 395/125 |
| 4,697,178 | 9/1987 | Heckel | 395/122 |
| 4,819,192 | 4/1989 | Kuragano et al. | 395/121 |
| 4,847,789 | 7/1989 | Kelly et al. | 395/121 |
| 4,935,879 | 6/1990 | Ueda | 382/54 |
| 4,945,495 | 7/1990 | Ueda | 395/130 |
| 5,075,876 | 12/1991 | Seki et al. | 395/121 |

(List continued on next page.)

FOREIGN PATENT DOCUMENTS

| | | |
|---|---|---|
| 49-29718 | 3/1974 | Japan . |
| 60-246481 | 12/1985 | Japan . |
| 60-250479 | 12/1985 | Japan . |
| 62-186373 | 8/1987 | Japan . |
| 60-80375 | 4/1988 | Japan . |
| 1-131976 | 5/1989 | Japan . |
| 2-308376 | 12/1990 | Japan . |
| 3-45427 | 7/1991 | Japan . |
| 3-45428 | 7/1991 | Japan . |
| 60-256880 | 12/1995 | Japan . |
| 2181929 | 4/1987 | United Kingdom . |
| 2194656 | 3/1988 | United Kingdom . |
| 22593432 | 3/1993 | United Kingdom . |
| 2259432 | 10/1993 | United Kingdom . |

OTHER PUBLICATIONS

Foley et al. "Viewing in 3D" and Scan–Line Algorithms, Computer Graphics: Principles and Practice, Second Edition, 1990 pp. 266–271 & 680–685.

Takeshi Shibamoto, et al., "Texture Mapping (1)" *The Collected Papers of Thirty-First Information Processing Institute Lecture*, Information Processing Institute, Sep. 9, 1985, pp. 1703–1704.

Heckbert, "Survey of Texture Mapping," IEEE CG&A, Nov. 1986, pp. 56–67.

*Primary Examiner*—Heather R. Herndon
*Assistant Examiner*—Cliff N. Vo
*Attorney, Agent, or Firm*—Oliff & Berridge

[57] ABSTRACT

An image synthesizing system is provided which can increase the speed of its hardware and reduce the scale of the same by using the subsampling/interpolation. A processor unit (80) determines coordinates of each dot and associated texture coordinates in polygons based on image data of vertices. A field buffer unit (40) stores the texture coordinates at its address specified by the coordinates of each dot. The texture coordinates are read out from the field buffer unit (40) and then used to read out rendering data from a texture data storage unit (42) to synthesize and output a pseudo 3-D image. In this case, the processor unit (30) includes a subsampling unit. Texture coordinates of the dots ignored by the subsampling unit are determined on the texture coordinates of dots adjacent to the ignored dots through interpolation circuits (180)–(186).

28 Claims, 34 Drawing Sheets

U.S. PATENT DOCUMENTS

| | | | |
|---|---|---|---|
| 5,086,496 | 2/1992 | Mulmuley | 395/121 |
| 5,097,427 | 3/1992 | Lathrop et al. | 395/130 |
| 5,125,074 | 6/1992 | Labeaute et al. | 395/121 |
| 5,175,806 | 12/1992 | Muskovitz et al. | 395/125 |
| 5,179,638 | 1/1993 | Dawson et al. | 395/125 |
| 5,214,753 | 5/1993 | Lee et al. | 395/125 |
| 5,222,205 | 6/1993 | Larson et al. | 395/130 |
| 5,230,039 | 7/1993 | Grossman et al. | 395/130 |
| 5,280,568 | 1/1994 | Obata | 395/121 |
| 5,283,860 | 2/1994 | Einkauf et al. | 395/134 |
| 5,325,470 | 6/1994 | Sumino et al. | 395/125 X |
| 5,327,509 | 7/1994 | Rich | 395/128 |
| 5,369,736 | 11/1994 | Kato et al. | 395/125 |
| 5,422,988 | 6/1995 | Koide | 395/125 X |

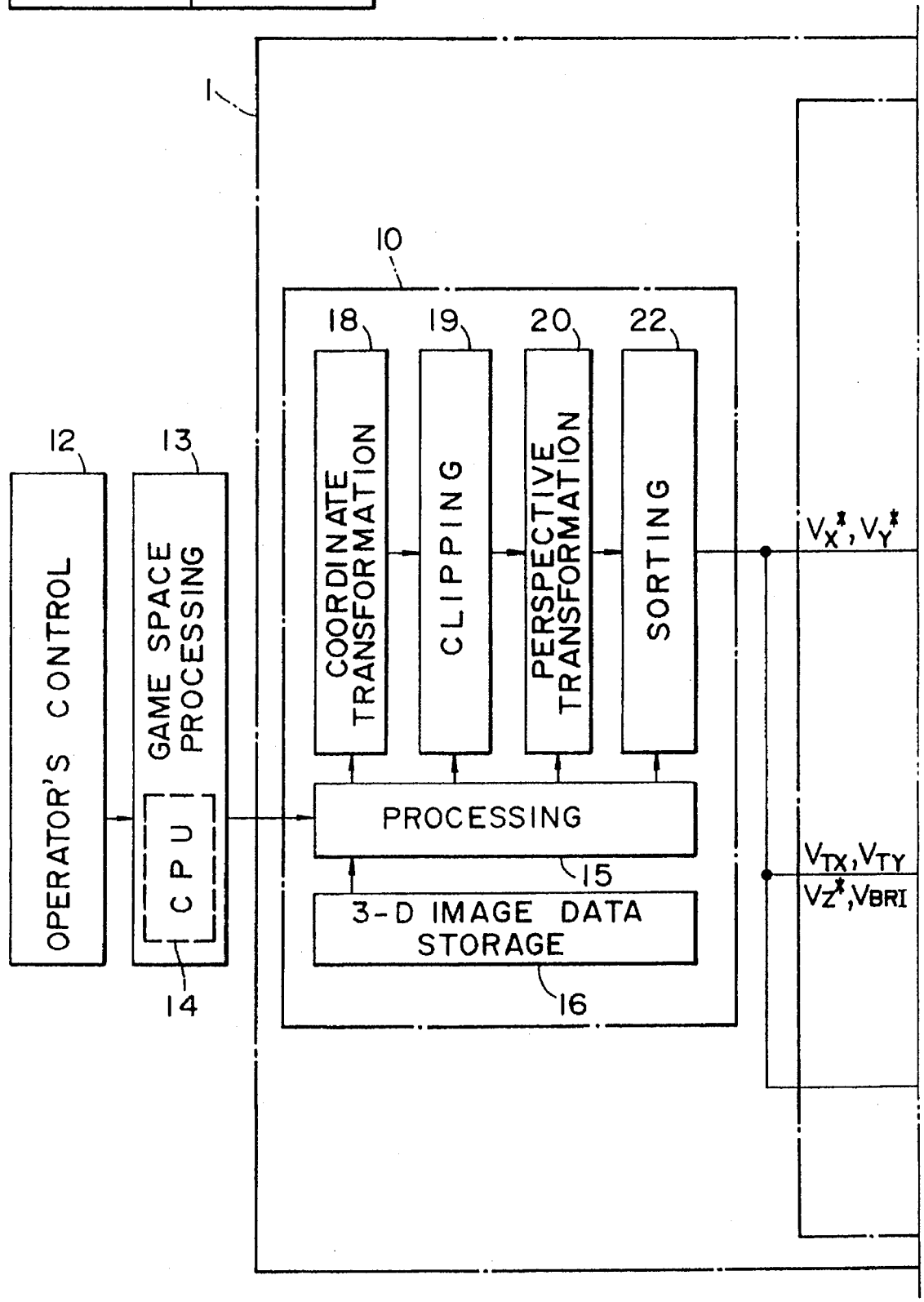

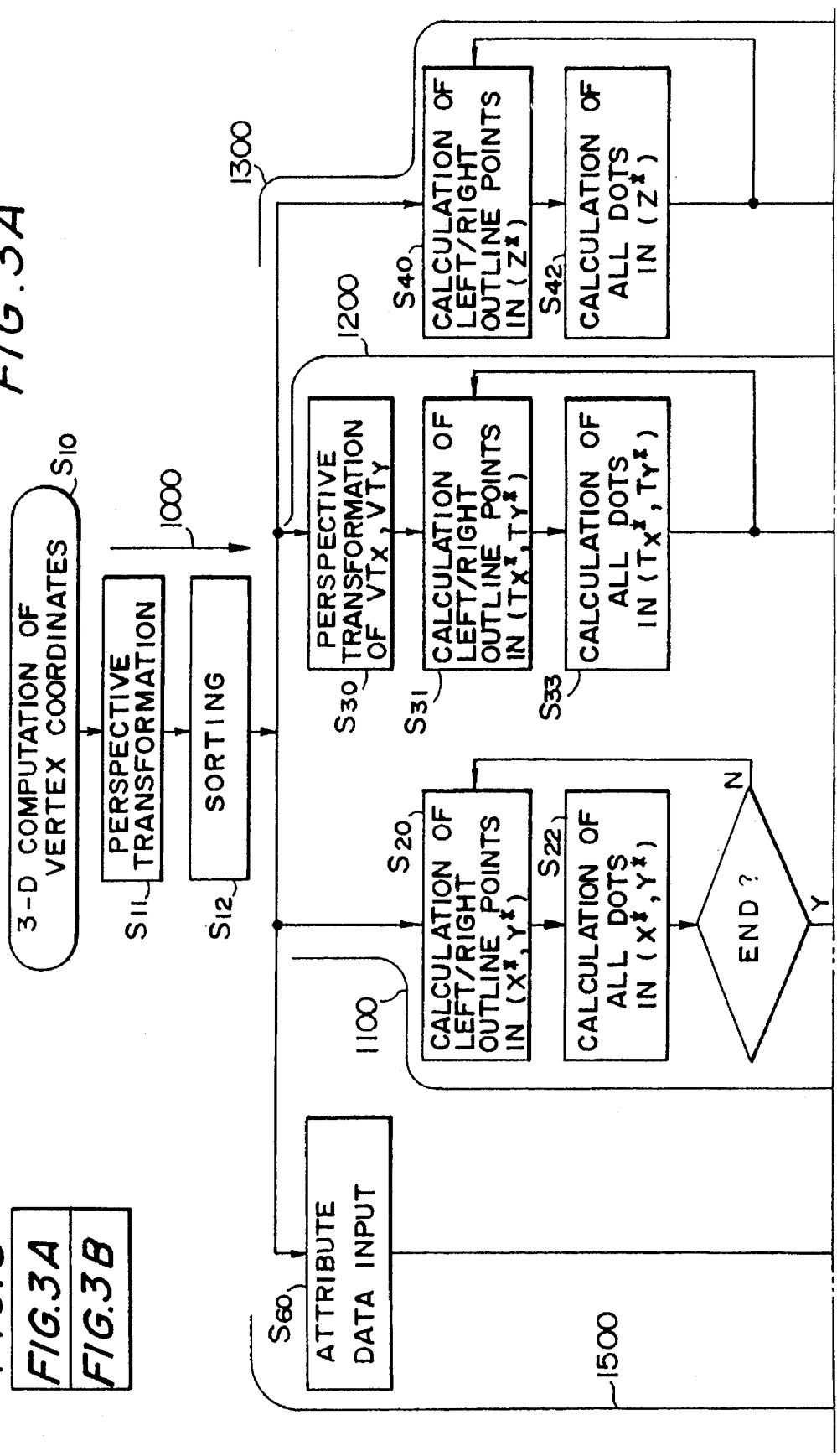

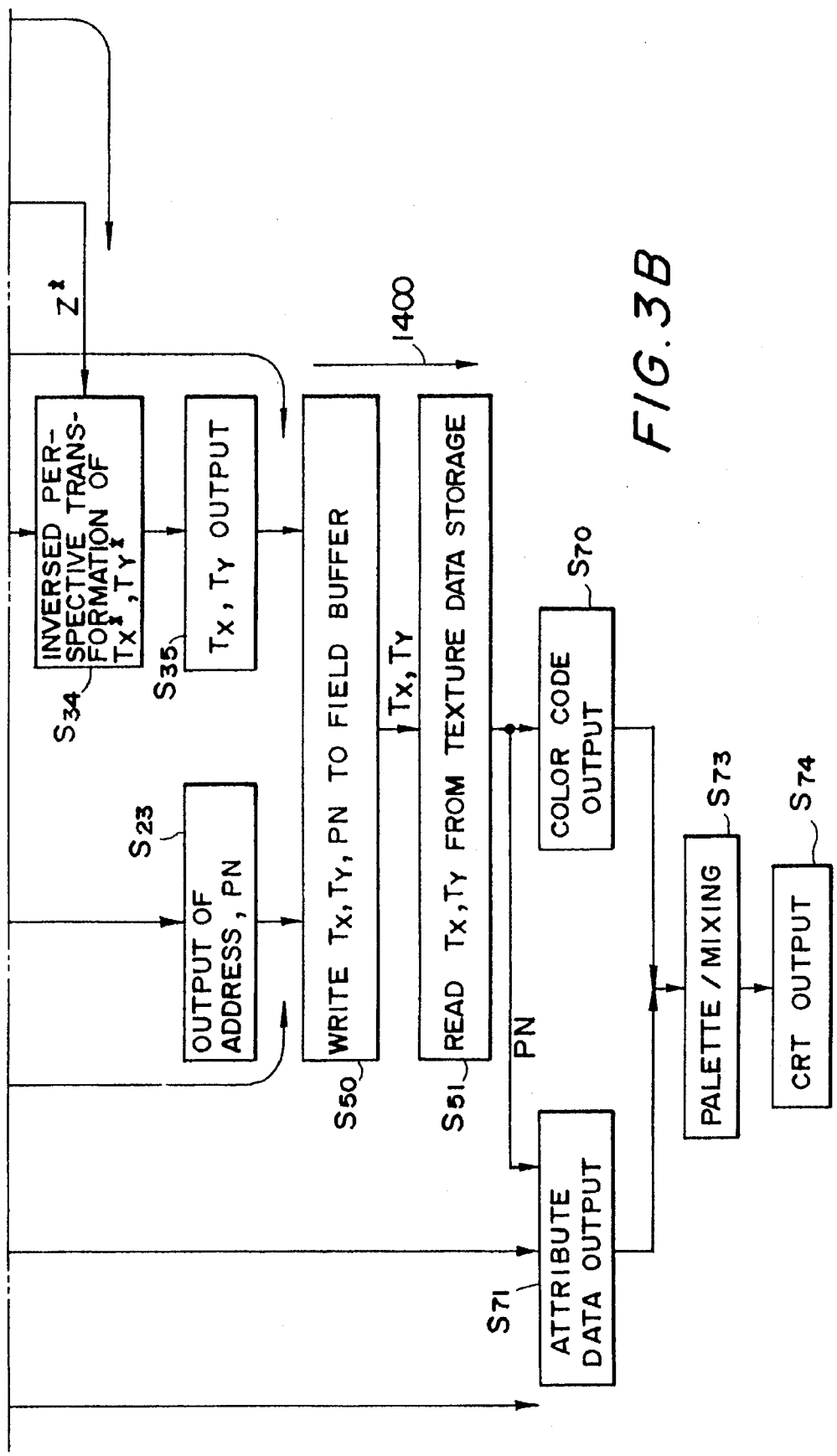

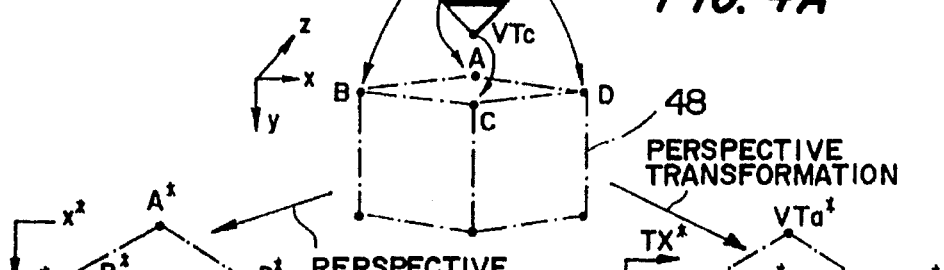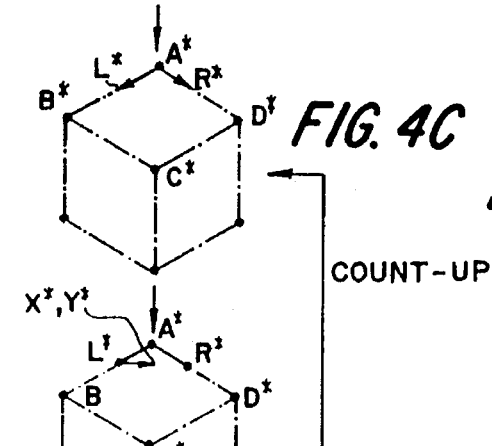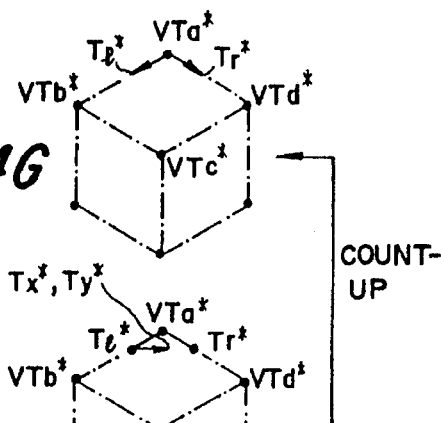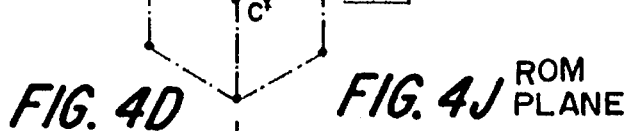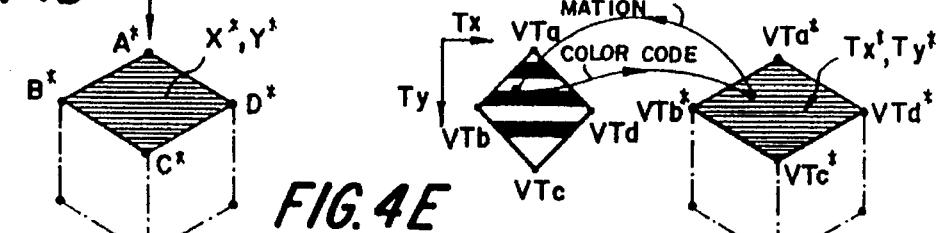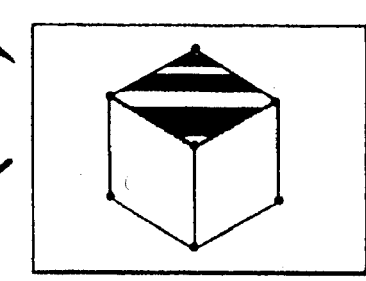

| FIG. 6A | FIG. 6B |

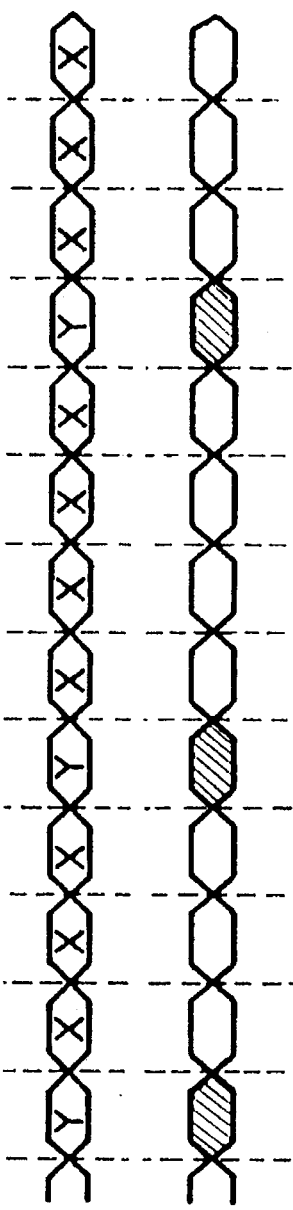
FIG. 9A CKI
FIG. 9B XPFIR
FIG. 9C XVW
FIG. 9D XHW
FIG. 9E AI0~9
FIG. 9F DI0~11
 DON'T CARE
 EFFECTIVE

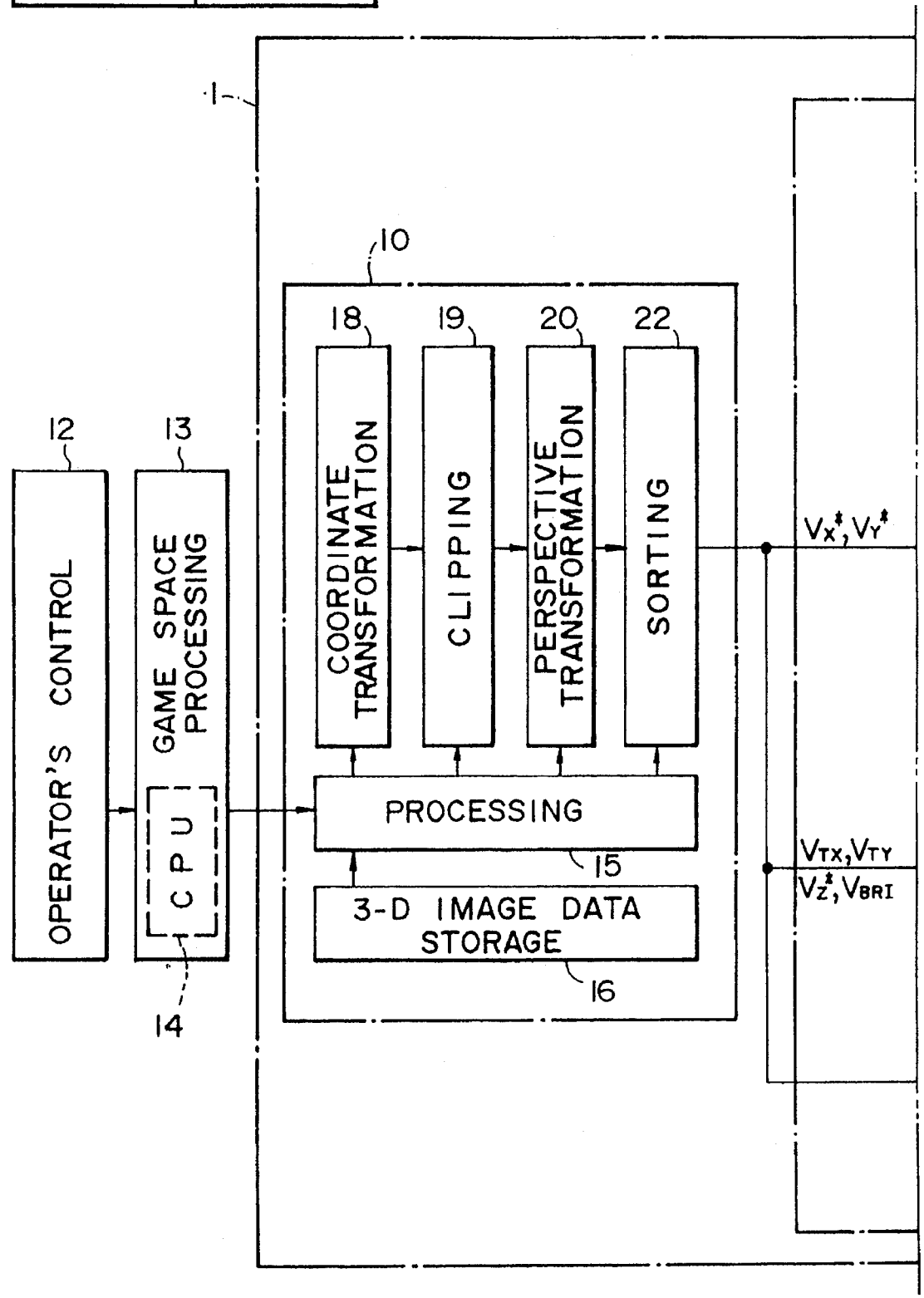

FIG. 15

ONE-LINE DATA ON FIELD BUFFER (SUBSAMPLED DATA)

| EMPTY | EMPTY | PN=0<br>TX=<br>TY=<br>BRI= | PN=0<br>TX=100<br>TY=24<br>BRI=64 | EMPTY<br>← EMPTY DOT AND ADJACENT DOTS HAVE SAME PN | PN=0<br>TX=200<br>TY=36<br>BRI=32 | EMPTY<br>← EMPTY DOT BUT ADJACENT DOTS HAVE DIFFERENT PN | PN=1<br>TX=1024<br>TY=777<br>BRI=86 |

⇓ INTERPOLATION

SERIAL READ DATA OUTPUT (OUTPUT AT DO0~11 TERMINALS)

| EMPTY | EMPTY | PN=0<br>TX=<br>TY=<br>BRI= | PN=0<br>TX=100<br>TY=24<br>BRI=64 | PN=0<br>TX=150<br>TY=30<br>BRI=48 | PN=0<br>TX=200<br>TY=36<br>BRI=32 | EMPTY | PN=1<br>TX=1024<br>TY=777<br>BRI=86 |

THE SAME PN AND TX, TY AND BRI ARE AVERAGE VALUES OF LEFT/RIGHT

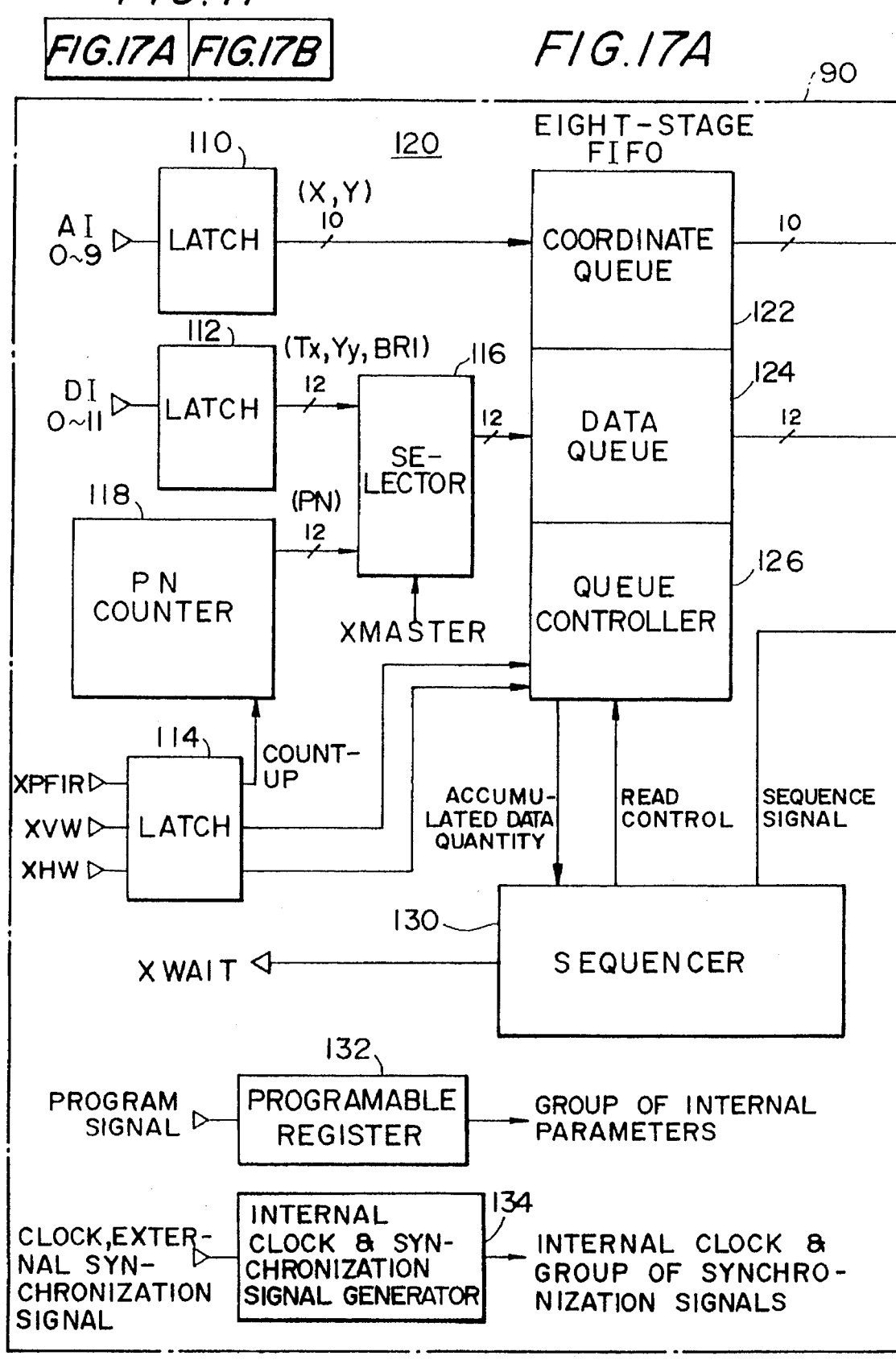

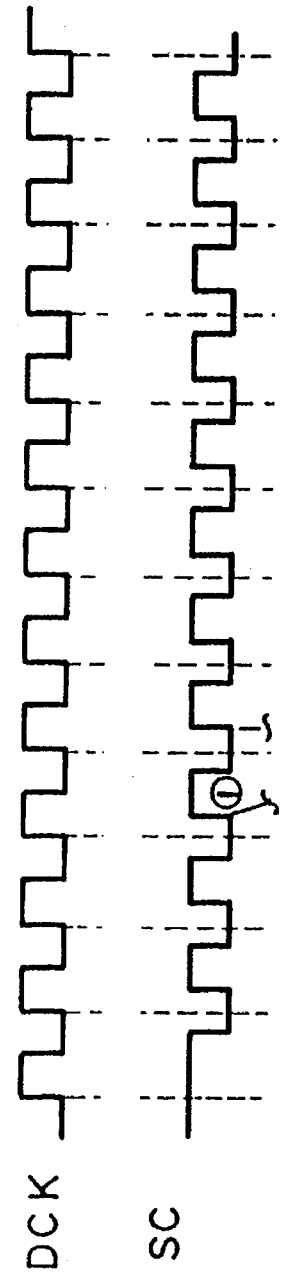
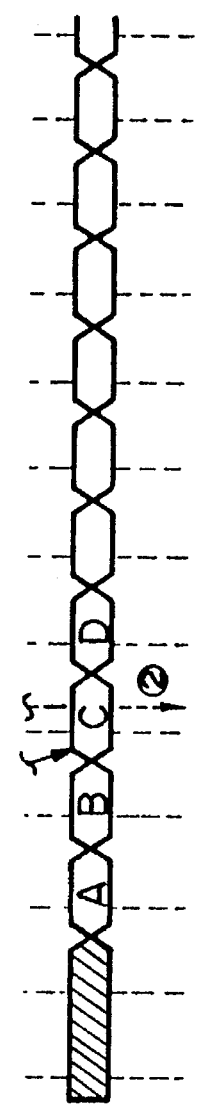
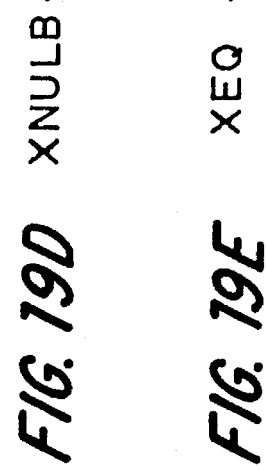
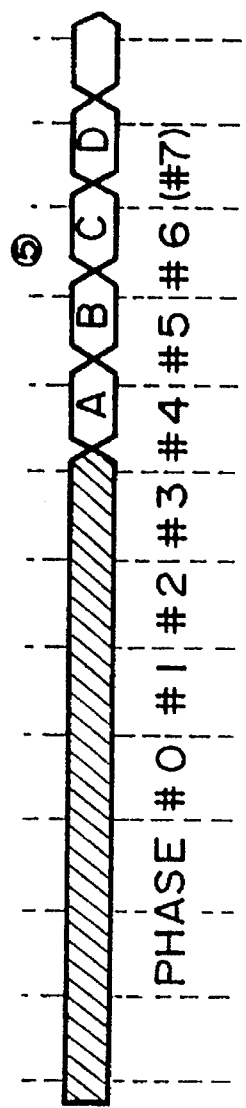
FIG. 19A  DCK
FIG. 19B  SC
FIG. 19C  DSO~11 (DATA READ OUT FROM SAM)
FIG. 19D  XNULB
FIG. 19E  XEQ
FIG. 19F  DO 0~11 (DATA OUTPUT)

IMAGE SYNTHESIZING SYSTEM HAVING A FIELD BUFFER UNIT THAT STORES TEXTURE COORDINATES

TECHNICAL FIELD

The present invention relates to an image synthesizing system and particularly to such a system which can perform the synthesization on off high-quality image in real time.

BACKGROUND TECHNIQUES

There are known various image synthesizing systems used as in three-dimensional (3-D) games, airplane or other vehicle simulators and so on. Typically, such image synthesizing systems have information of image relating to a 3-D object 300 as shown in FIG. 24, which has previously been stored therein. Information of image is perspectively transformed into a pseudo 3-D image 308 on a screen 306. As a player 302 makes an operation with a control panel 304 such as rotation, translation or the like, the system responds to the control signal to perform the processing with respect to rotation, translation or the like of the image of the 3-D object 300 in real time. Thereafter, the processed 3-D image is perspectively transformed into the pseudo 3-D image on the screen 306. As a result, the player 302 itself can rotate or translate the three-dimensional objects in real time to experience a virtual 3-D space.

FIG. 25 shows one of such image synthesizing systems. The image synthesizing system will be described as being applied to a 3-D game.

As shown in FIG. 25, the image synthesizing system comprises an operator's control unit 510, a game space processing unit 500, an image synthesizing unit 512 and a CRT 518.

The game space processing unit 500 sets a game space in response to control signals from the operator's control unit 510 and in accordance with a game program which has been stored in a central processing unit 506. Namely, the processing is performed with respect to what position and direct/on the 3-D object 300 should be arranged in.

The image synthesizing unit 512 comprises an image supply unit 514 and an image forming unit 516. The image synthesizing unit 512 performs the synthesization of a pseudo 3-D image in accordance with information of a game space set by the game space processing unit 500.

In this image synthesizing system, 3-D objects in the game space are defined as polyhedrons which are divided into 3-D polygons. As shown in FIG. 24, For example, the 3-D object 300 is represented as a polyhedron which is divided into 3-D polygons 1–6 (polygons 4–6 not shown herein). The coordinates and associated data of each vertex in each of the 3-D polygons (which will be referred to "image data of vertices") have been stored in a 3-D image data storage 552.

The image supply unit 514 performs various mathematical treatments such as rotation, translation and others, and various coordinate conversions such as perspective transformation and others, for the image data of vertices, in accordance with the setting of the game space processing unit 500. After the image data of vertices has been processed, it is permuted in a given order before outputted to the image forming unit 516.

The image forming unit 516 comprises a polygon generator 570 and a palette circuit 580. The polygon generator 570 comprises an outline (polygon edges) point processing unit 324 and a line processor 326. The image forming unit 516 is adapted to perform a process of painting all the dots (pixels) in the polygon with a predetermined color data or the like in the following procedure:

First of all, the outline point processing unit 324 calculates left-hand and right-hand outline points which are intersection points between polygon edges AB, BC, CD, DA and other polygon edges and scan lines, as shown in FIG. 26. Subsequently, the line processor 326 paints, with specified color data, sections between the left-hand and right-hand outline points, for example, sections between L and Q; Q and R as shown in FIG. 26. In FIG. 26, the section between L and Q is painted by red color data while the section between Q and R is painted by blue color data. Thereafter, the color data used on painting are transformed into RGB data in the palette circuit 580, and then the RGB data in turn is outputted to and displayed in CRT 518.

In such an image synthesizing system of the prior art, all the dots on a single polygon can be painted only by the same color, as described. As can be seen in FIG. 26, for example, the dots on the polygon 1 are only painted by red color; the dots on the polygon 2 are only painted by yellow color; and the dots on the polygon 3 are only painted by blue color. Thus, the formed image is monotonous without reality.

If an object having its complicated surface is to be displayed to avoid such a monotonousness, the number of divided polygons must greatly be increased. For example, if a 3-D object 332 having a texture of color data as shown in FIG. 27 is to be formed by the image synthesizing system of the prior art, it is required to divide a polyhedron into polygons 1–80 (polygons 41–80 not shown herein) for processing. Namely, various processing operations including the rotation, translation and perspective transformation, the treatment of polygon outline, the painting and the like must be performed for all the polygons. It is thus required to treat polygons ten-odd times those of the 3-D object 300 having no texture as shown in FIG. 24. However, the system for synthesizing an image in real time must terminate the drawing of an image to be displayed by treating all the dots for every field (¹/₆₀ seconds). In order to draw such a 3-D object 332 having a texture of color data, one requires a hardware having a very increased speed or an increased scale to perform a parallel operation. As the number of polygons to be processed is increased, the memory and data processor of the system is necessarily increased in scale. In image synthesizing systems such as video game machines which are limited in cost and space, it is therefore subsequently impossible to draw a pseudo 3-D image having a delicate texture with high quality.

In the field of computer graphics and the like, there is known a texture mapping technique shown in FIG. 28. The texture mapping separates the image data of a 3-D object 332 into the image data of a polyhedron 334 and the texture data of textures 336 and 338, which are in turn stored in the system. On displaying an image, the texture data of the textures 336, 338 are applied to the polyhedron 334 to perform the image synthesization. (One of the texture mapping type image synthesizing techniques is disclosed in Japanese Patent Laid-Open No. Sho 63-80375, for example).

The texture mapping technique is realized in the field of very large-scale and expensive image processing systems such as exclusive image-processing computers known as graphics work stations, flight simulators and so on. Very few image synthesizing systems which are relatively inexpensive, like video game machines, utilize the texture mapping technique since it is difficult to increase the speed and scale of their hardwares. In addition, such video game machines can only display limited numbers and sizes of 3-D objects and the mapping they provide is inaccurate since the operation is performed by a simple approximation. As a result, the reality of the image is very degraded. Furthermore, the real-time display is insufficient since the frequency of updating the scene is low, that is, several frames per second.

In order to decrease the number of computations in the hardware to increase in speed and to reduce in scale, the number of computations for the most data, that is, the number of linear interpolations for representing coordinates, texture data, brightness data and other data in the displayed scene for the respective dots may be reduced. To this end, there is one effective means for subsampling these data and interpolating data on output.

In the bit-map type image synthesizing system of the prior art, however, the color data itself is stored in the field buffer unit. If the subsampling/interpolation is to be carried out in the prior art, it raises the following problems. In this case, if the color data stored in the field buffer unit includes color codes or is coded to be color data, the interpolation itself is impossible. This is completely out of the question. If the stored color data is RGB output or the like, the quality of a synthesized image is extremely degraded. More particularly, the texture data is optionally provided depending on an image to be displayed. The row of the texture data has neither linearity nor mathematical regularity. As a result, subsampling such data means that the image data itself is partially lost. Such a partially lost image data cannot be recovered by the interpolation. Thus, the quality of the synthesized image is very inferior in partial loss of data and others. As a result, the bit-map type image synthesizing system of the prior art could not substantially reduce the scale of its hardware and increase the speed of the same through the subsampling/interpolation technique.

In view of the aforementioned problems of the prior art, an object of the present invention is to provide an image synthesizing system which can increase the speed of the hardware and reduce the scale of the same particularly through the subsampling/interpolation technique.

DISCLOSURE OF THE INVENTION

To this end, the present invention provides an image synthesizing system from perspective-transforming a 3-D image consisting of polygons onto a projection plane to synthesize a pseudo 3-D image, said image synthesizing system comprising:

a processor unit for determining coordinates of each of dots in the polygons forming the 3-D image and texture coordinates corresponding to the coordinates of each dot responsive to image data of vertices of polygons, a field buffer unit for snoring said texture coordinates determined by said processor unit at an address specified by said coordinates of each dot, a rendering data storage unit for storing rendering data at an address specified by said texture coordinates, and an image data forming unit for reading out said texture coordinates from said field buffer unit, and for forming image data by reading out the rendering data from said rendering data storage unit using the read texture coordinates, said processor unit including a subsampling unit for computing the coordinates of subsampled dots and corresponding texture coordinates, said image data forming unit including an interpolation unit for interpolating the texture coordinates of an ignored dot, that is ignored by subsampling, responsive to the texture coordinates of dots adjacent to the ignored dot stored in said field buffer unit.

According to the present invention, not the color data but the texture coordinates, is stored in the field buffer unit. The texture coordinates are read out from the field buffer unit and then used to read out the rendering data (texture data) stored in the rendering data storage unit (texture data storage unit) to form the image data. Therefore, the subsampling/interpolation technique which reduces scale of the hardware and increases the speed in the process can be realized without substantial degradation of image quality. More particularly, the processor unit performs the subsampling process, the subsampled texture coordinates being stored in the field buffer unit. If the interpolation procedures are carried out on these subsampled texture coordinates when they are read out from the field buffer unit, there can be realized a unique computation technique which can reduce the load on the hardware without substantial degradation of image quality.

In this case, the image synthesizing system is possible wherein said processor unit determines brightness data corresponding to the coordinates of each dot responsive to image data of vertices of polygons, said field buffer unit further stores said brightness data determined by said processor unit at an address specified by said coordinates of each dot, said interpolation unit interpolates the brightness data of the ignored dot responsive to the brightness data of dots adjacent to the ignored dot stored in said field buffer unit.

In such an arrangement, the rendering procedures can be carried out by the use of the brightness data and the image synthesization using Gouraud shading technique or the like can be realized. Even in this case, the brightness data can be subjected to the subsampling/interpolation. Consequently, high-quality images can be synthesized while reducing the scale of the hardware and increasing the speed in processing.

Furthermore, the image synthesizing system is possible wherein in place of the rendering data storage unit, the image synthesizing system comprises a function computing unit for applying a function computation to the texture coordinates to determine the rendering data and wherein the image data forming unit reads out said texture coordinates from said field buffer unit and the function computing unit determines the rendering data for forming the image data responsive to the read texture coordinates.

In such an arrangement, the function computing unit is responsive to the texture coordinates to form the desired rendering data. Therefore, the high-quality image can be synthesized by using the texture mapping. Further, the texture mapping known as bump mapping may also be performed through a relatively small-scale circuit arrangement. Particularly, an image effect which would not realized by the prior art can be produced by using a random number generator or the like.

Moreover, the image synthesizing system is desirable wherein at least one type of rendering data stored in the rendering data storage unit is color data and wherein said color data is read out by the use of said texture coordinates to form an image data.

Moreover, the image synthesizing system is possible wherein at least one type of rendering data stored in the rendering data storage unit is surface shape data and wherein said surface shape data is read out by the use of said texture coordinates to form an image data.

In this way, the color data and surface shape data can be used as rendering data for performing the texture mapping. The present invention may also use the other data such as brightness data, transparency data, diffuse reflectance data and so on. For example, if a normal vector, the displacement of the normal vector (perturbation component) or the height of reliefs formed on the surface of the object is used as surface shape data, the texture mapping can be carried out through the bump mapping.

Moreover, the image synthesizing system is desirable wherein the interpolation unit linearly interpolates the texture coordinates of dots adjacent to the ignored dot.

Such a linear interpolation enables the interpolation unit to be formed in a more simple arrangement.

Moreover, the image synthesizing system is desirable wherein the subsampling unit does not ignore a dot which is on the polygon outline or on the boundary between adjacent polygons.

If the subsampling/interpolation is carried out in such a manner, the polygon outline and the boundary between the adjacent polygons can effectively be prevented from becoming vague.

Moreover, the image synthesizing system is desirable wherein dots not used to draw the polygon images being written in said field buffer unit as empty dots and polygon identification numbers for identifying the polygons being further written in said field buffer unit and that said interpolation unit performs said interpolation to a dot to be processed when the dot to be processed is an empty dot and when dots adjacent to the empty dot have the same polygon identification number and are not empty dots.

In such an arrangement, the interpolation can be carried out using the empty dots and polygon identification numbers. More particularly, the interpolation unit can judge whether or not the interpolation should be carried out simply by judging whether or not the dot to be processed is empty dot, whether or not the dots adjacent to that empty dot have the same polygon identification number and whether or not the does adjacent to that empty dot are empty dots. As a result, the interpolation unit can be formed into a very simple arrangement, resulting in reduction of the hardware scale, simplification of the process and increase of the processing speed.

Moreover, the image synthesizing system is possible wherein the ignoring procedures by subsampling and the interpolation procedures are carried out for continuous plurality of dots on the screen.

By thus increasing the rate of subsampling, the scale of the hardware can further be reduced with increase of the processing speed.

Moreover, the image synthesizing system further comprising an attribute data storage unit for storing an attribute data which is image data common within each of polygons forming a 3-D image and wherein in response to the polygon identification number read out from the field buffer unit, the attribute data is read out from the attribute data storage unit to form the image data.

Thus, the attribute data storage unit stores the attribute data which is an image data common within each of polygons. By reading the attribute data from the attribute data storage unit through the polygon identification number written in the field buffer unit, any further high-quality image can be synthesized by a more simple circuit arrangement. For example, if the bump mapping is to be performed through the displacement of a normal vector, the original normal vector thereof may be specified by this attribute data.

BRIEF DESCRIPTION OF THE DRAWINGS

FIG. 3, comprised of FIGS. 3A–3B, is a flowchart showing the summary of an image processing computation in the image synthesizing system relating to the present invention.

FIG. 4, comprised of FIGS. 4A–K, are schematic views visually illustrating the summary of the image processing computation in the image synthesizing system relating to the present invention.

FIG. 9 is a timing chart illustrating a writing sequence to the field buffer unit.

FIG. 15 is a schematic view illustrating one of the interpolation techniques.

FIG. 19 is a timing chart illustrating the operation of the interpolation circuit.

FIGS. 23A and 28B are schematic views illustrating a logic-arithmetic circuit which is formed by a random number generator.

Figure 1B:
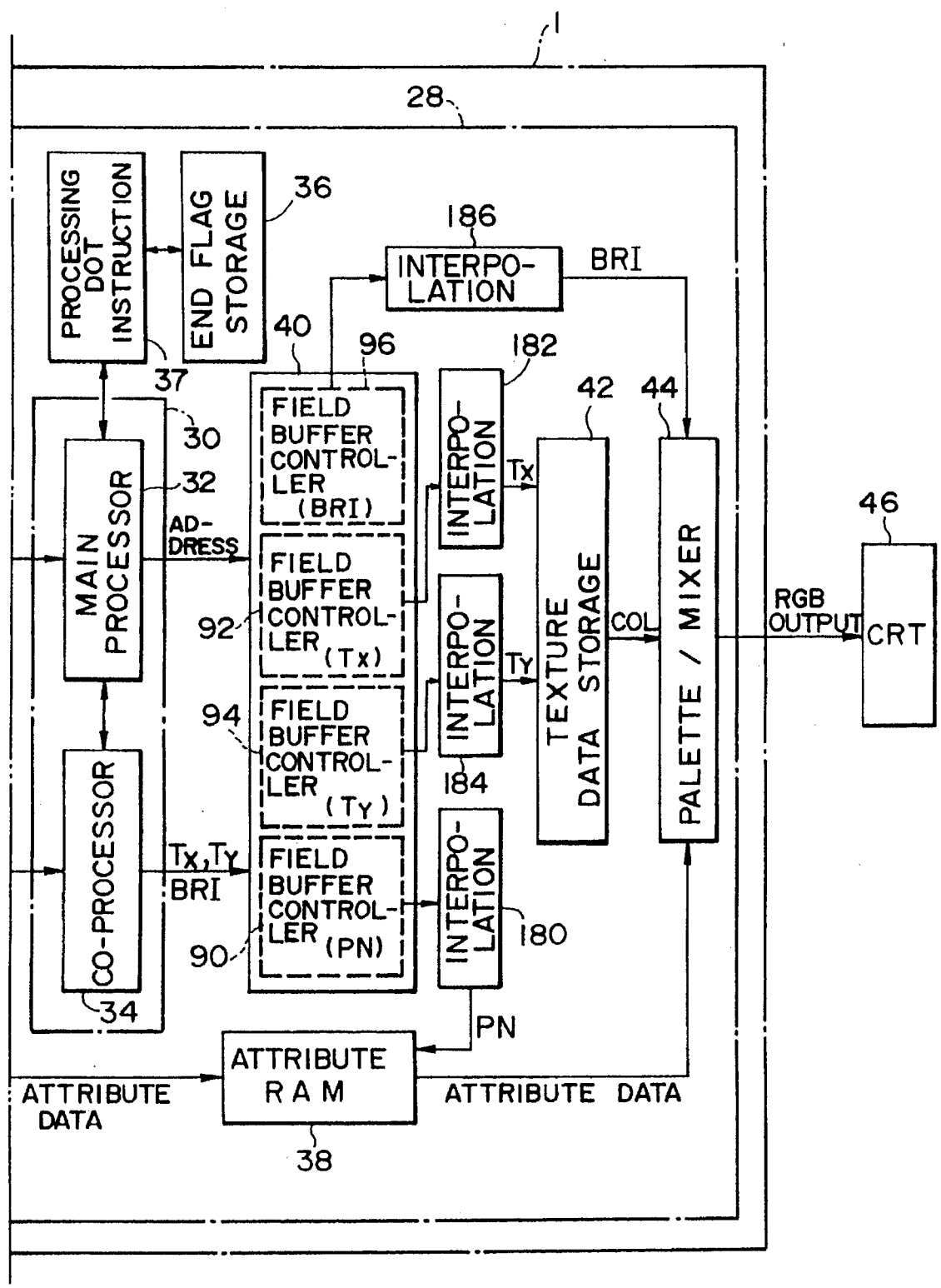
FIG. 1, comprised of FIGS. 1A–1B, is a block diagram of one embodiment of an image synthesizing system constructed in accordance with the present invention.

BEST MODE FOR CARRYING OUT THE INVENTION (1) General Arrangement

Referring to FIG. 1, there is shown one embodiment of an image synthesizing system constructed in accordance with the present invention, which comprises an operator's control unit 12, a game space processing unit 13, an image synthesizing unit 1 and a CRT 46. The image synthesizing unit 1 comprises an image supply unit 10 and an image forming unit 28. The image synthesizing system will be described as applied to a 3-D game.

The game space processing unit 13 sets a game space in accordance with a game program stored in a central processing unit 14 and a control signal from the operator's control unit 12. More particularly, the game space processing unit 13 computes the setting data of a game space which is defined by the positions and directions of 3-D objects (e.g. airplanes, mountains, buildings, etc.), the position and view of a player and so on. The computed setting data is then outputted to the image supply unit 10 in the image synthesizing unit 1.

The image supply unit 10 performs a given computing process, based on the setting data of the game space. More particularly, the computing process includes the coordinate transformation from the absolute coordinate system to the view coordinate system, the clipping, the perspective transformation, the sorting and so on. The processed data is outputted to the image forming unit 28. In such a case, the output data is represented as divided into data in the respective polygons. More particularly, the data is defined by image data of vertices including the representing coordinates, texture coordinates and other associated information of each vertex in the polygons.

The image forming unit 28 computes the image data in the interior of the polygon from the image data of vertices with the computed data being outputted to the CRT 46.

The image synthesizing system of this embodiment can carry out the image synthesization more effectively through two techniques known as texture mapping and Gouraud shading. The concepts of these techniques will briefly be described.

Figures 27A, 27B:
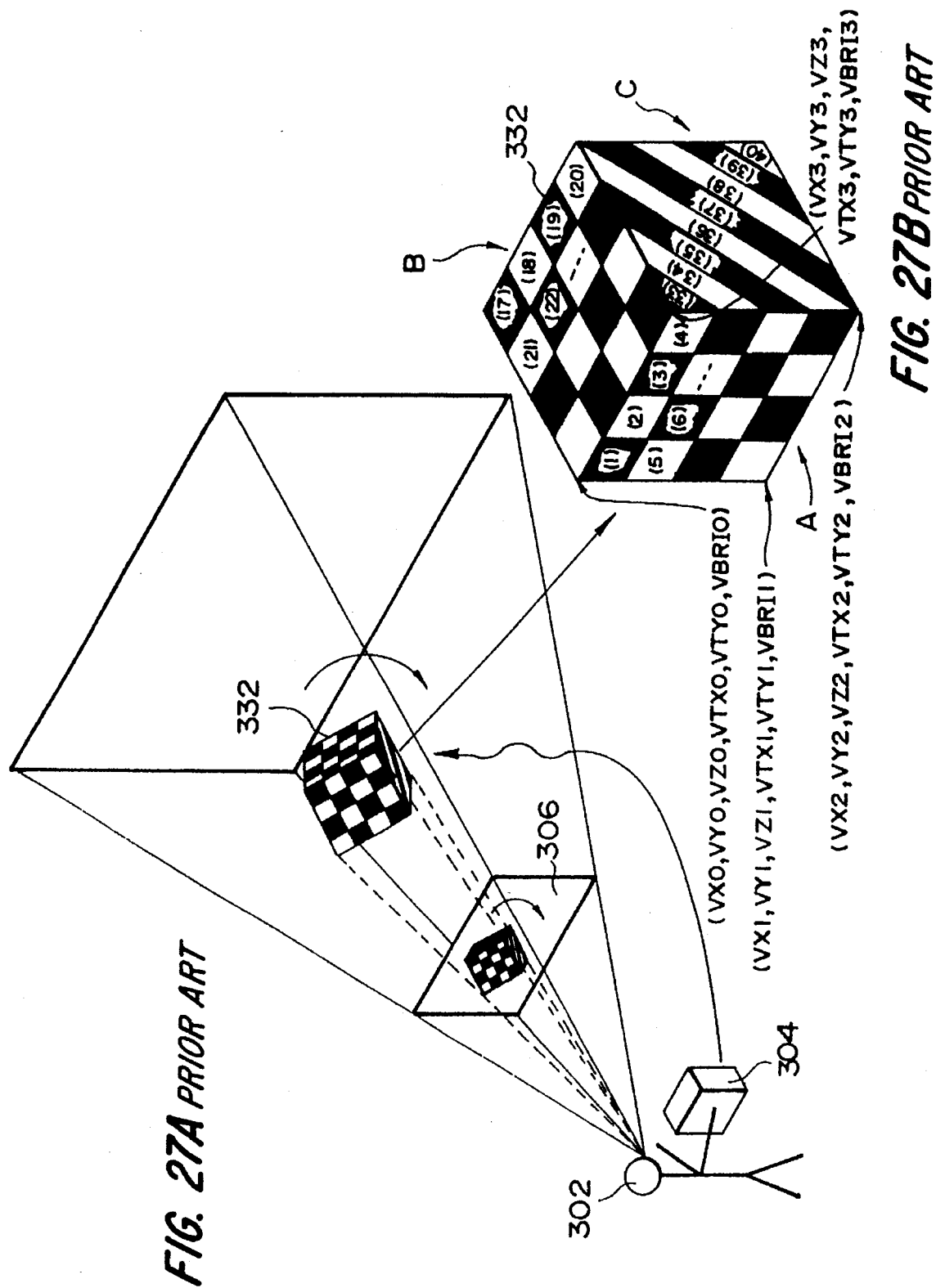
FIG. 27 is a schematic view illustrating an image device for synthesizing a 3-D object having a mapped texture into an image.
Figure 28:
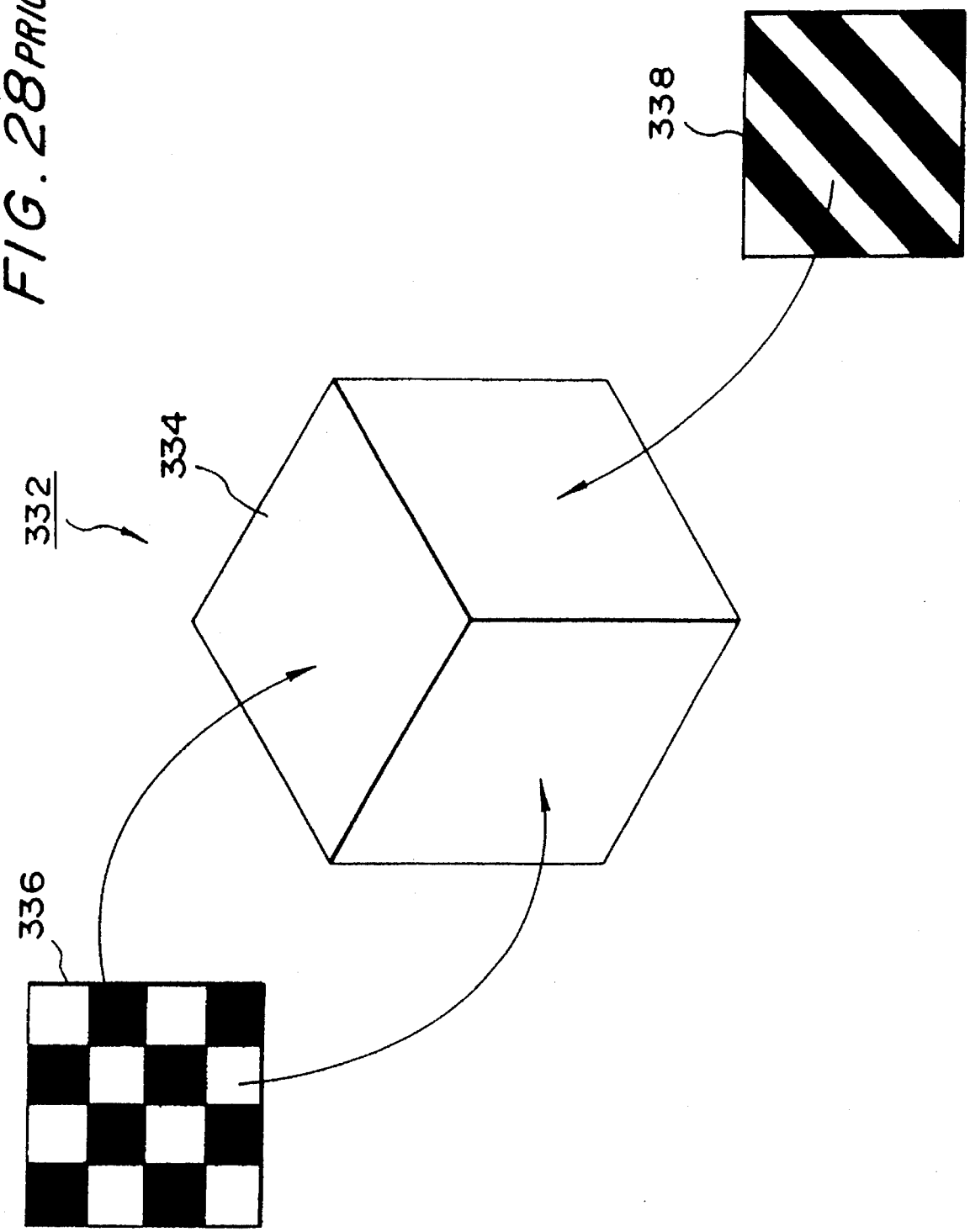
FIG. 28 is a schematic view illustrating the concept of the texture mapping.

FIG. 27 shows the concept of the texture mapping technique.

When it is to synthesize a pattern such as grid or stripe on a 3-D object 332 at each surface as shown in FIG. 27, the prior art divided the 3-D object 332 into 3-D polygons 1–80 (polygons 41–80 not shown herein), all of which were processed. This is because the image synthesizing system of the prior art can paint the interior of one polygon with only one color. When it is wanted to synthesize a high-quality image having a complicated pattern, therefore, the number of polygons will so increase that the synthesization of high-quality image substantially becomes impossible.

Therefore, the image synthesizing system of the present invention performs various treatments such as rotation, translation, coordinate transformation such as perspective transformation and clipping to each of 3-D polygons A, B and C defining the respective surfaces of the 3-D object 332 (more particularly, each of the vertices in the respective 3-D polygons). Patterns such as grids and stripes are handled as texture, separating from the treatment of the polygons. Namely, as shown in FIG. 1, the image forming unit 28 includes a texture data storage unit (rendering data storage unit) 42 in which texture data ( rendering data) to be applied to the 3-D polygons, that is, image data relating to the patterns such as grids, stripes and the like have been stored.

The texture data storage unit 42 stores the texture data each of which addresses is given as texture coordinate VTX, VTY of each vertex in the respective 3-D polygons. More particularly, texture coordinates (VTX0, VTY0), (VTX1, VTY1), (VTX2, VTY2) and (VTX3, VTY3) are set for each vertex in the polygon A, as shown in FIG. 27.

Figure 2A:
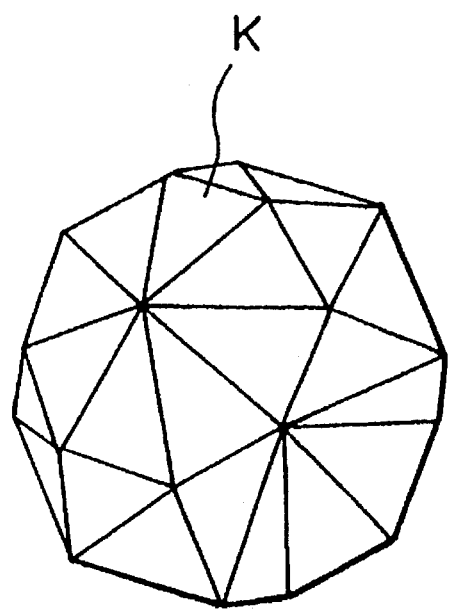
FIG. 2 is a schematic view illustrating a problem of brightness continuity.
Figure 2B:
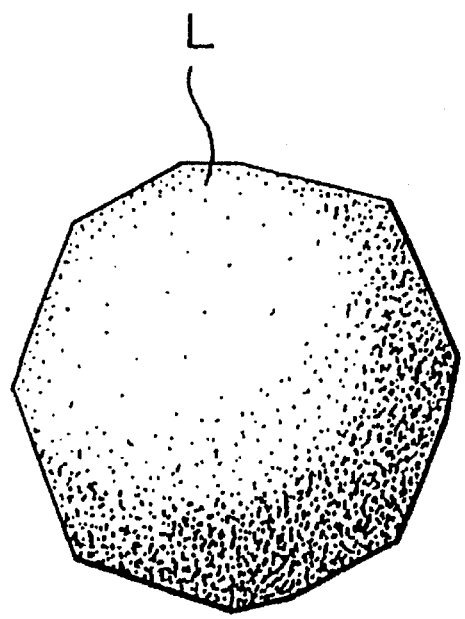

The image forming unit 28 uses the texture coordinates VTX, VTY for each vertex to determine texture coordinates TX, TY for all dots in the polygon. Texture data corresponding to the determined texture coordinates TX, TY is read out from the texture data storage unit 42. Thus, the image of the 3-D object onto which the texture of grids or stripes as shown in FIG. 2 is applied can be synthesized.

Such a technique can greatly reduce the amount of data to be processed. As a result, the present invention can provide an image synthesizing system which is optimum for synthesizing a high-quality image in real time.

As described, the image synthesizing system of the present invention represents the 3-D object 332 of FIG. 27 as a mass of 3-D polygons. It thus raises a problem with respect to the continuity in brightness data at the boundary of each 3-D polygon. For example, when it is wanted to represent a sphere using a plurality of 3-D polygons and if all the dots (pixels) in the polygon are set at the same brightness, the boundary of the 3-D polygon will not be represented to have a "rounded surface." In order to overcome such a problem, the image synthesizing system of the present invention uses a technique known as Gouraud shading. Like the aforementioned texture mapping, Gouraud shading has given brightness data VBRI0–VBRI3 to each vertex in the respective 3-D polygons, as shown in FIG. 27. When the image Forming unit 28 is to display a final image, brightness data for all the dots in the polygon are determined by an interpolation method using the brightness data of vertices, namely VBRI0, VBRI1, VBRI2, VBRI3. Through such a technique, thus, a 3-D object K represented by a polygon polyhedron can be image synthesized as a 3-D object L in which a "rounded surface" in the boundaries is represented, as shown in FIG. 2.

According to such a technique, the aforementioned "rounded surface" problem call be overcome while at the same time reducing the processing required by the image synthesizing system. Therefore, the present invention can provide an image synthesizing system which is optimum for synthesizing a high-quality image in real time.

(2) Image Supply Unit

The image supply unit 10 performs the following treatment. First of all, a processing unit 15 reads out the image data of a 3-D object to be arranged in a game space from a 3-D image data storage unit 16. The processing unit 15 then outputs the image data of the 3-D object to a coordinate transformation unit 18 after they have been added by positional and directional data. Thereafter, the coordinate transformation unit 18 performs the coordinate transformation from the absolute coordinate system to the view coordinate system. Subsequently, clipping, perspective transformation and sorting units 19, 20 and 22 perform clipping, perspective transformation and sorting, respectively. The image data of vertices of the processed polygon is outputted to the image forming unit 28.

The sorting unit 22 permutes the output order of the image data of vertices of the polygon in accordance with a predetermined priority. More particularly, the sorting unit 22 sequentially outputs the image data of vertices of the polygons to the image forming unit 28, starting from the closest polygon to the view point in the scene. Therefore, the image forming unit 28 will sequentially process the polygons, starting from the more overlying polygon in the scene.

(3) Image Forming Unit

The image forming unit 28 functions to compute the image data of all the dots in the polygons from the image data of vertices of the polygons which are inputted from the sorting unit 22 into the image forming unit 28 in a given sequence. The operation of the image forming unit 28 will schematically be described below.

First of all, a processor unit 30 sequentially receives the image data of vertices of polygons including the representing coordinates, texture coordinates, brightness data and other associated information of vertices from the sorting unit 22. Common data shared by all of the dots in a polygon is inputted into an attribute RAM unit 38 as attribute data.

The processor unit 30 uses the representing coordinates, texture coordinates and brightness data of vertices to determine representing coordinates, texture coordinates TX, TY and brightness data BRI all the dots in the polygons. The texture coordinates TX, TY and the brightness data BRI thus determined are written in a field buffer unit 40 using said representing coordinates as addresses.

A main processor 32 is connected to processing dot instruction unit 37 and end flag storage unit 36. These units 37 and 36 are used to omit the processing operation for any dot which has already been processed and painted. Load on the subsequent computing process can greatly be reduced.

On displaying an image, the texture coordinates TX, TY are read out from the field buffer unit 40 and used as addresses to read the texture data from the texture storage unit 42. The texture data is used in a palette/mixer circuit 44 with the attribute data from the attribute RAM unit 38 to form RGB data which in turn is outputted as an image through CRT 46.

FIG. 3 shows a flowchart illustrating the operation of the image synthesizing system according to the present embodiment. FIGS. 4A–4K visually show the computing techniques which are carried out in the flows 1100, 1200 and 1300 of this flowchart.

The operations shown by the flow 1000 in FIG. 3 are executed by the image supply unit 10 and sorting unit 22. The sorting unit 22 outputs polygon data for each polygon. Since the polygons have already been given their priority levels, the polygon data are outputted from the sorting unit 22 according to the priority. The polygon data of each polygon includes perspective-transformed representing coordinates and texture coordinates for the vertices of that polygon.

The perspective-transformed representing coordinates VX* and VY* from the sorting unit 22 are inputted into the main processor 32 wherein the computation along the flow 1100 is executed. More particularly, left and right outline points are computed and the perspective-transformed representing coordinates X* and Y* for each dot on a scan line surrounded by the left and right outline points are also computed. These computations are repeated until all the dots defining a polygon have been processed. The resulting perspective-transformed representing coordinates X* and Y* for each dot are outputted to the field buffer 40 as write addresses. A polygon identification number PN is written in the field buffer unit 40 at its addressed area.

In parallel with the operation shown by the flow 1100, the co-processor 34 executes the other flows 1200 and 1300.

Namely, the co-processor 34 receives the texture coordinates VTX, VTY, perspective-transformed representing coordinate VZ* and brightness data for each vertex in the polygons from the sorting unit 22.

In accordance with the flow 1200, the co-processor 34 determines perspective-transformed texture coordinates VTX* and VTY* from the texture coordinates VTX and VTY for each vertex. The coordinates VTX* and VTY* are then used to compute left and right outline points. Perspective-transformed texture coordinates TX* and TY* are then computed for each dot on a scan line surrounded by the left and right outline points. The computations are repeated until all the dots of the polygon have been processed.

In parallel with such computations, the co-processor 34 executes the computations along the flow 1300 to calculate perspective-transformed representing coordinate Z* for each dot.

In a step 34 along the flow 1200, the perspective-transformed texture coordinates TX* and TY* determined for each dot are inversely perspective-transformed into output texture coordinates TX and TY using the perspective-transformed representing coordinate Z*. The output texture coordinates TX and TY will be written into the field buffer unit 40 at a write address which is output ted at a step 23 along the flow 1100.

In such a manner, the texture coordinates TX, TY and polygon identification number PN will be written into the field buffer unit 40 at addresses specified by the flow 1100, that is, addresses for the respective dots defining the polygon.

In parallel with such a write operation, attribute data for the respective polygon that are outputted from the sorting unit 22 are sequentially stored in the attribute RAM unit 38 according to the flow 1500.

Such a series of operations are repeated each time when each polygon data is outputted From the sorting unit 22. Thus, the data write operation is repeated to the field buffer 40 and attribute RAM 38.

When the data write operation corresponding to one scene has terminated, the data readout operation from the field buffer 40 and attribute RAM 38 is initiated. In the present embodiment, however, each off the field buffer and attribute RAM units 40, 38 has its image data storage space corresponding to two scenes. Therefore, the write and readout operations are actually simultaneously carried out. This improves the efficiency in the process.

First, the field buffer unit 40 outputs the texture coordinates TX and TY written therein for each dot to the texture data storage unit 42 as write addresses, for example, in synchronism with the horizontal scan in the display. At the same time, the polygon identification number PN is outputted to the attribute RAM unit 38 as a write address.

Thus, the color code specified by the address is outputted from the texture data storage unit 42 to the palette/mixer circuit 44. Further, the attribute data corresponding to the polygon identification number PN is outputted from the attribute unit 38 to the palette/mixer circuit 44. Thus, the palette/mixer circuit 44 outputs color data (e.g. RGB output) to the CRT 46 wherein a desired pseudo 3-D image will be synthesized and displayed.

FIG. 4 visually shows the summary of the computation carried out in the image forming unit 28. As described, the image forming unit 28 is responsive to the image data of vertices to perform a computation for forming all the image data in the polygon. In this case, the texture data to be applied to the polygon has been stored in the texture data storage unit 42. The texture coordinates TX and TY are thus required to read out this texture data From the texture data storage unit 42. Further, FIGS. 4F, 4G, 4H and 4I visually show a computation for determining all the perspective-transformed texture coordinates TX* and TY* in the polygon. This computation is carried out by the co-processor 34. Further, FIGS. 4B, 4C, 4D and 4E visually show a computation for determining perspective-transformed representing coordinates X* and Y* which are used to display the texture data. This computation is carried out by the main processor 32. As shown in FIG. 4J, the computed perspective-transformed texture coordinates TX* and TY* are inversely perspective-transformed into texture coordinates TX and TY through which the texture data is read out From the texture data storage unit 42. Finally, as shown in FIG. 4K, the image synthesization will be performed by relating the read texture data to a location represented by the computed coordinates X* and Y*. The summary of the computation through the respective steps shown in FIGS. 4A–4K will be described below.

As shown in FIG. 4A, texture coordinates VTa, VTb, VTc and VTd are applied to a polyhedron 48 at vertices (e.g. A, B, C and D). These texture coordinates of vertices VTa - VTd are used to address a texture data which is mapped to a polygon formed by the vertices A - D. More particularly, the texture coordinates VTa - VTd are used to specify addresses for reading out texture data which have been stored in the texture data storage unit 42 at its memory means.

As shown in FIGS. 4B and 4F, the vertex representing coordinates A* - D* and vertex texture coordinates VTa - VTd are perspectively transformed into perspective-transformation vertex representing coordinates VTa* - VTd*. Thus, the perspective transformation is carried out not only to the X-Y coordinate system but also to the TX-TY coordinate system, such that the linearity between these coordinate system will be maintained.

As shown in FIGS. 4C and 4G, polygon outline points formed by the perspective-transformed representing coordinates A* - D* and perspective-transformed texture coordinates VTa* - VTd* are linearly interpolated. More particularly, coordinates L*, R* of left and right outline points and texture coordinates Tl*, Tr* of left and right outline points all of which are shown in FIGS. 4D and 4H are linearly interpolated.

As shown in FIGS. 4D and 4H, coordinates of dots on a scan line connecting the left and right outline points are linearly interpolated from the coordinates L*, R* of left and right outline points and coordinates Tl*, Tr* of left and right outline points texture.

The computations shown in FIGS. 4C, 4G and 4D, 4H are repeated until the perspective-transformed representing coordinates X*, Y* and perspective-transformed texture coordinates TX*, TY* are linearly interpolated for all the dots defining a polygon, as shown in FIGS. 4E and 4I.

As shown in FIG. 4J, inversed perspective transformation is performed on the perspective-transformed texture coordinates TX* and TY* to obtain texture coordinates TX and TY which are in turn used to read out color codes from the texture data storage unit 42.

In this manner, the color codes can be applied to the perspective-transformed representing coordinates X* and Y*. As shown in FIG. 4K, thus, an image is synthesized on the screen and the texture mapping can be performed without damage of the far and near sense and linearity.

Figure 5:
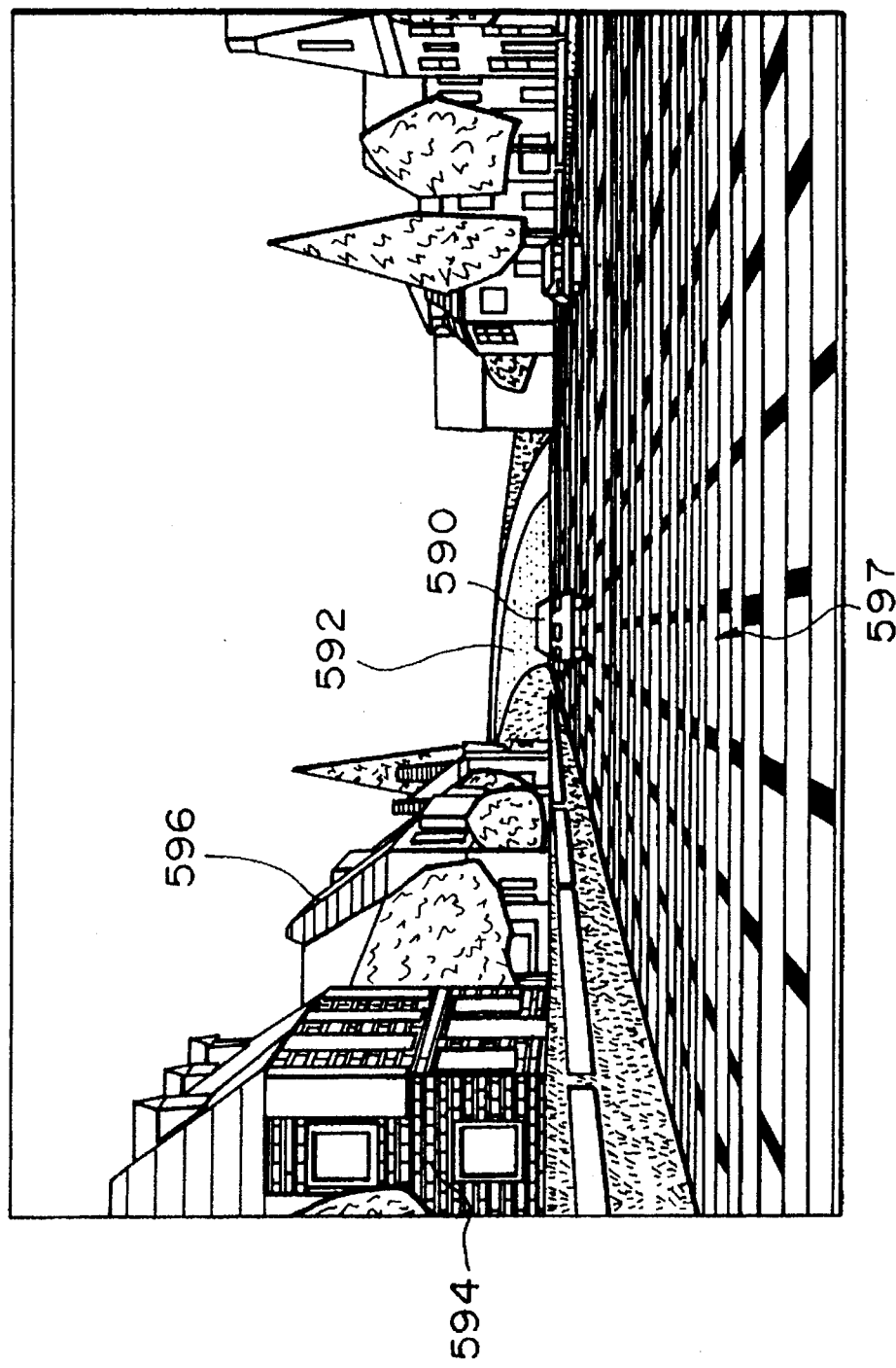
FIG. 5 is a view showing a pseudo 3-D image synthesized by the image synthesizing system relating to the present invention.

FIG. 5 shows a pseudo 3-D image synthesized in the above manner. As can be seen from FIG. 5, the desired texture mapping is performed at houses 594, a distant road 592, a brick-topped road 597 and others. This provides a very real image, compared with the prior art which would paint the surface of each polygon with a single color. In addition, the far and near sense and linearity of the texture mapped to the brick-topped road 597 are not degraded as can be seen from FIG. 5. In such a manner, the image synthesizing system off the first embodiment can synthesize a pseudo 3-D image greatly improved in quality and reality.

Although FIG. 4 does not show the computation of the perspective-transformed representing coordinate Z* and brightness data BRI, they may be computed in substantially the same manner as in the computation off TX and TY in FIG. 4. The interpolation off brightness data is also carried out in the same manner as in TX and TY. Therefore, the linear relationship between these coordinate systems can be maintained to synthesize an image with a more increased reality.

(4) Field Buffer Unit

Figures 6, 6A:
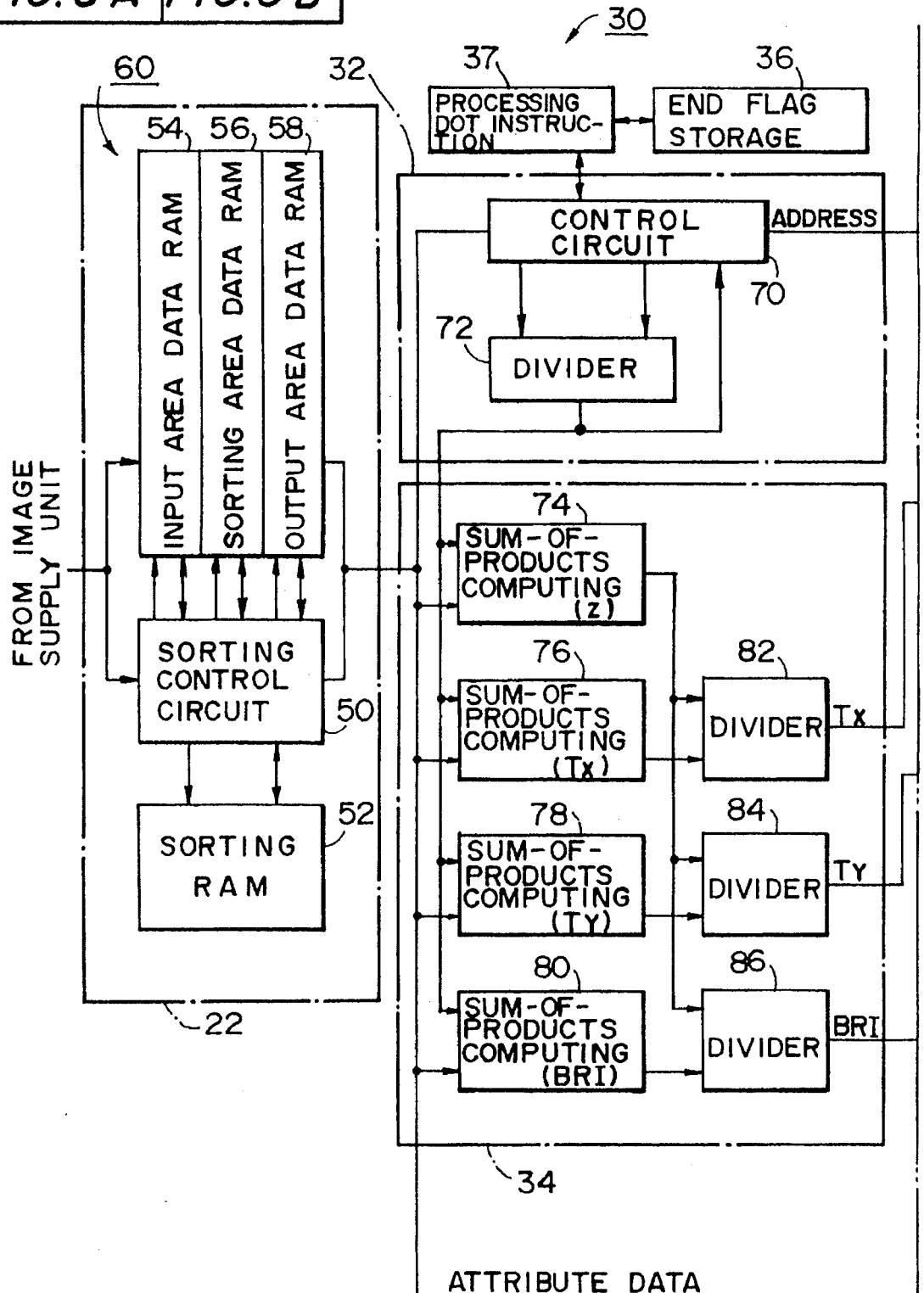
FIG. 6, comprised of FIGS. 6A–6B, is a block diagram showing details of the embodiment of the present invention.
Figure 6B:
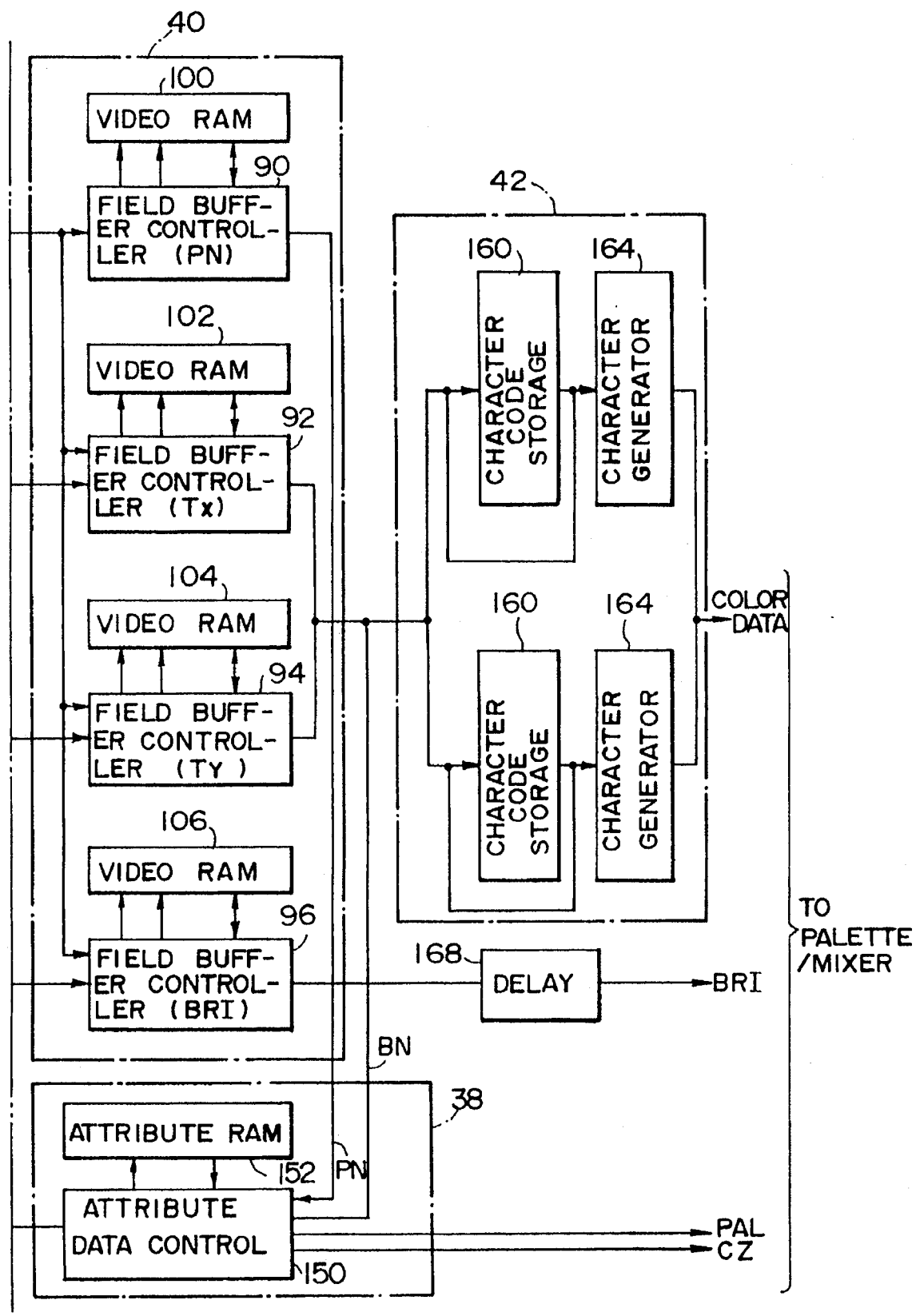

FIG. 6 shows the details of the present embodiment which include the sorting unit 22, processor unit 30, attribute RAM unit 38, field buffer unit 40 and texture data storage unit 42.

For simplicity, the interpolation circuits 180–186 are omitted in FIG. 6 as well as FIGS. 7 and 12 which will be described.

As shown in FIG. 6, the field buffer unit 40 comprises video RAMs 100, 102, 104 and 106 and field buffer controllers 90, 92, 94 and 96 for controlling these video RAMs.

A field buffer space defined by the video RAMs 100–106 stores data corresponding to dots in the CRT display screen in one-to-one ratio. In the first embodiment, data stored in the field buffer space includes texture coordinates TX and TY, brightness data BRI and polygon identification numbers PN which are computed by the co-processor 34. Addresses at which the data are to be written are decided from the perspective-transformed representing coordinates X* and Y* which are computed by the main processor 32.

Each of the video RAMs is of a multi-port type and divided into a random port (RAM) and a serial port (SAM). In the present embodiment, the data are written to the field buffer space in random access and read out serially in synchronism with dot clocks. The field buffer space is divided into write and read banks which are switched from one to another for every field (1/60 seconds).

Figure 7:
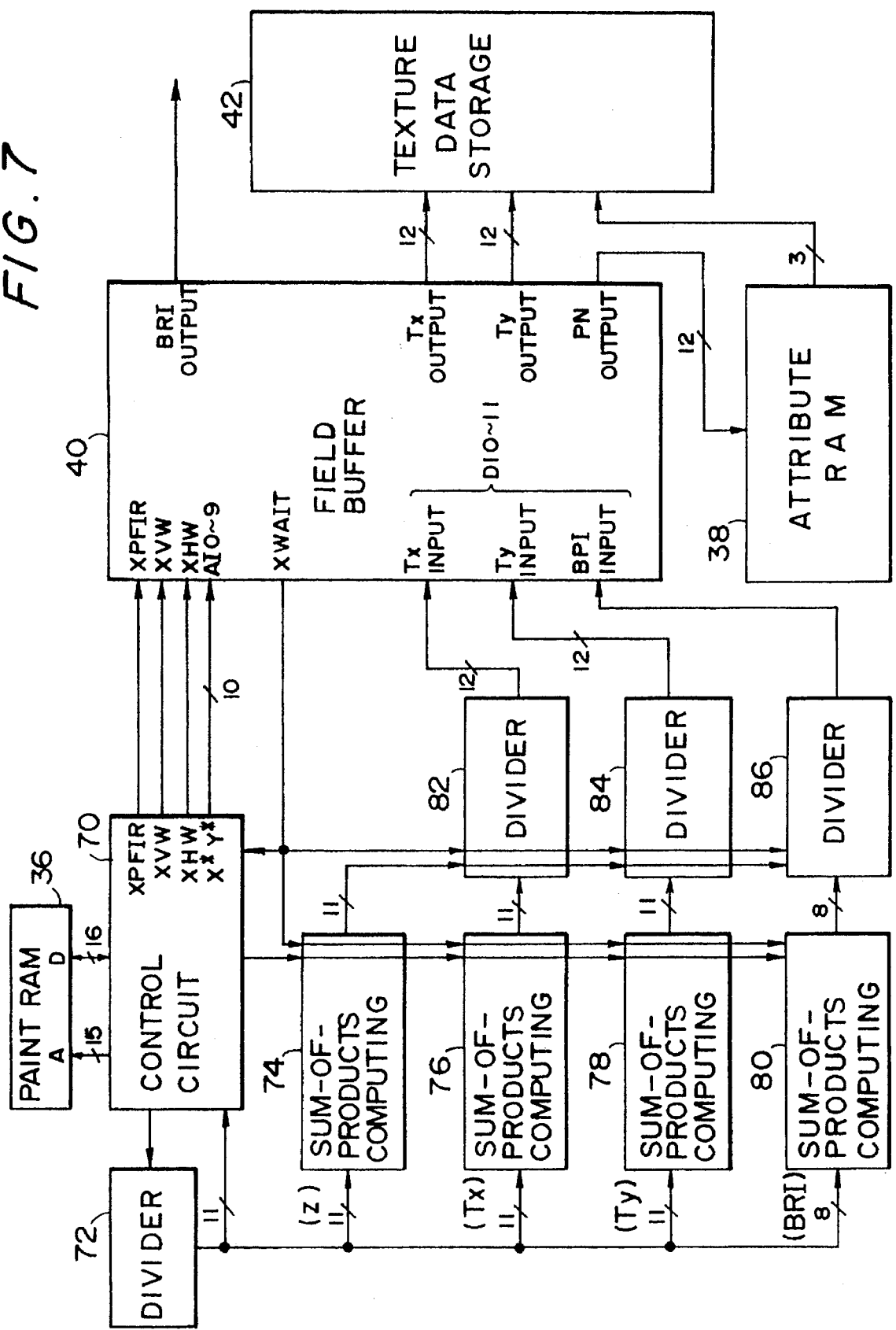
FIG. 7 is a block diagram showing the peripheral circuits of the field buffer unit and the connection therebetween.
Figures 8, 8A:
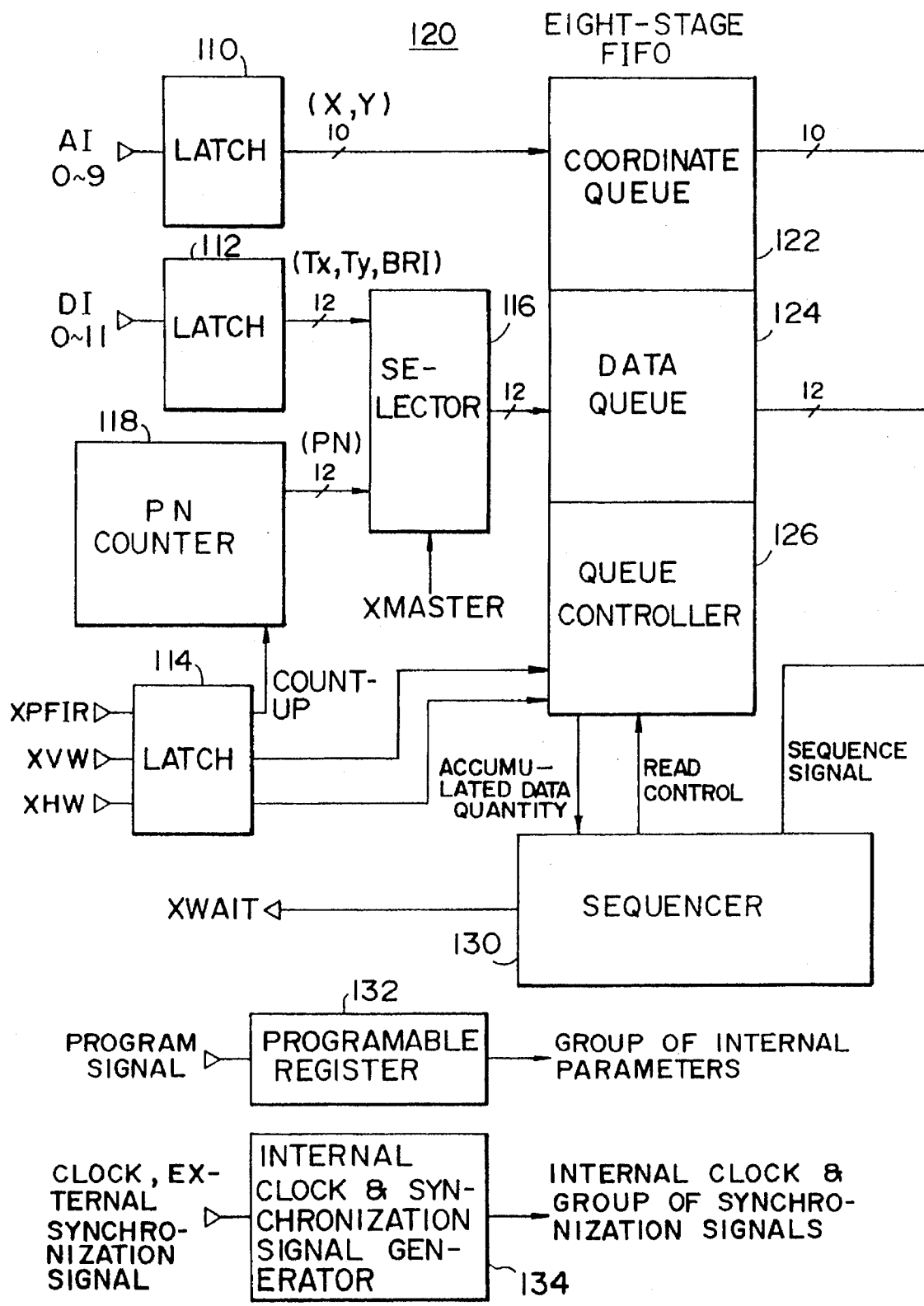
FIG. 8, comprised of FIGS. 8A–8B, is a block diagram showing the internal circuits of the field buffer controller.
Figure 8B:
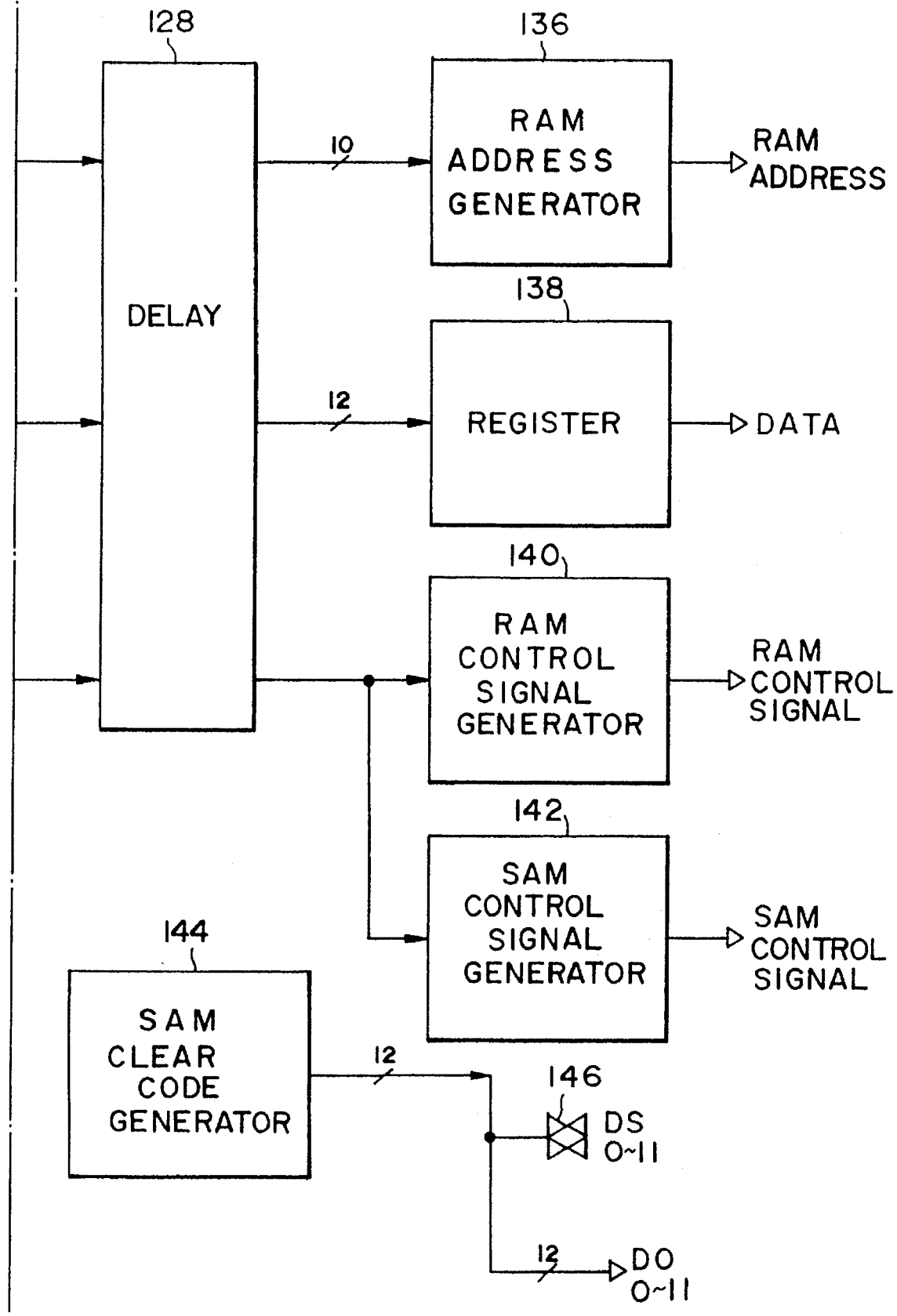

FIG. 7 shows the details of the peripheral circuits and connections therebetween in this field buffer unit 40 while FIG. 8 shows an internal circuitry in each of the field buffer controllers 90–96 which defines the field buffer unit 40. FIG. 9 shows a sequence of writing data to the field buffer unit 40.

As shown in FIG. 7, the field buffer unit 40 receives the following signals: the perspective-transformed representing coordinates X* and Y* are inputted from the control circuit 70 to the field buffer unit 40 as address signals AI0–9 and XPFIR, XVW and XHW are inputted to the field buffer unit 40 as control signals for the field buffer controllers 90–96. The texture coordinates TX, TY and BRI are also inputted from dividers 82–86 to the field buffer unit 40 as input DI0–11 for the field buffer controllers 92–96. Program signals of a program resistor, clocks, synchronization signals and other signals are further inputted to the field buffer unit 40.

As shown in FIG. 7, the following signals are outputted from the field buffer unit 40. The field buffer unit 40 outputs XWAIT signal used to inhibit the data writing to the processor unit 30 which comprises the control circuit 70 and the like. The field buffer unit 40 also outputs texture coordinates TX and TY being read data to the texture data storage unit 42. The field buffer unit 40 further outputs polygon identification numbers PN to the attribute RAM unit 38 and brightness data BRI to a palette/mixer circuit 44.

The internal circuitry of each of the field buffer controllers 90–96 is as shown in FIG. 8.

The field buffer controllers in the present embodiment have three modes, which are master, slave and extension. In the present embodiment, the field buffer controller 90 for handling the polygon identification numbers PN is used in the master mode; the field buffer controllers 92–94 for handling the texture coordinates TX and TY are used in the slave mode; and the field buffer controller 96 for handling the brightness data BRI is used in the extension mode. The field buffer controllers 92–96 used in the slave and extension modes are thus controlled under the management of the field buffer controller 90 used in the master mode and in synchronism with the field buffer controller 90. Therefore, a larger field buffer space can be simultaneously controlled by the field buffer controllers 90–96 which have the same circuit structure. In this case, as shown in FIG. 8, the switching of master, slave and extension modes from one to another is carried out by a selector 116. In the master mode, a polygon identification number PN generated by a PN counter 118 is selected by the selector 116 and inputted to a data Queue 124. In the slave and extension modes, DI0–11 are selected and inputted to the data Queue 124.

Clock signals and external synchronization signals inputted to the field buffer controllers 90–96 are then inputted to an internal clock & synchronization signal generating circuit 134 which in turn generates internal clocks and a group of synchronization signals used as control signals for the field buffer controllers 90–96. A program signal is inputted to a programmable register 132 wherein internal parameter groups in the controllers are determined.

Address signals AI0–9, input data DI0–11 and control signals XPFIR, XVW and XHW are temporally latched by latches 110, 112 and 114.

The signal XPFIR is used to count up the PN counter 118, the count-up value thereof being used to determine the polygon identification number PN. In other words, as shown in FIG. 9, the signal XPFIR is outputted from the control circuit 70 of the main processor 32 such that XPFIR=L is established at each time when a new polygon begins to be processed. When XPFIR=L, the PN counter 118 will be counted up. Before the next field begins to be processed, the PN counter 118 is reset. In such a manner, polygon identification numbers PN 0, 1, 2, 3, 4 and so on will sequentially be set at the respective polygons, starting from the highest priority thereof.

According to this embodiment, thus, the polygon identification numbers PN can be generated internally or in the field buffer controller 90 without any external input off polygon identification number PN. By utilizing this polygon identification number PN, the process can be carried out while separating the common and non-common polygon image representing data for dots forming a polygon from each other. Consequently, the hardware can be increased in speed and reduced in scale.

Address signals AI0–9 and input data DI0–11 are once accumulated in a coordinate Queue 122 of an eight-stage FIFO 120 and the data Queue 124 and then stored in the video RAMs. In this case, whether the address signals AI0–9 are recognized as X or Y address depends on the control signals XVW and XHW inputted into a Queue controller 126. As shown in FIG. 9, the addresses AI0–9 are recognized as Y address when XVW=L and XHW=H and as X address when XVW=H and XHW=L. Further, the signals XVW and XHW also serve as signals identifying whether or not the input data DI0–11 are effective.

A sequencer 130 monitors the data accumulated in the eight-stage FIFO 120 to control the data by outputting XWAIT signal to the external and read control signal to the eight-stage FIFO 120. The sequencer 130 also generates sequence signal for controlling the video RAMs.

The X and Y data accumulated in the eight-stage FIFO 120 and Tx, Ty and BRI data are outputted to a RAM address generating circuit 138 and a register 138 through a delay circuit 128, respectively. The data accumulated in the register 138 will be written in the video RAMs according to RAM addresses which are generated by the RAM address generating circuit 138. Thus, by providing the eight-stage FIFO 120, data can be written into the video RAMs 100–106 without interruption of the computation in the forward stage processor unit 30 and so on. This can improve the process in efficiency. IF the data output of the processor unit 30 varies too much, the number of stages in the FIFO may further be increased.

The sequence signal is outputted from the sequencer 130 to RAM control signal generating circuit 140 and SAM control circuit 142 through the delay circuit 128, respectively. Thus, these circuits will generate control signals for RAM being write port and control signals for SAM being read port, respectively.

A terminal 146 is a bi-directional data bus capable of switching from input to output and vice versa. When the serial port SAM is to be initialized, the terminal 146 is switched to the output side, through which clear codes generated by SAM clear code generating circuit 144 are outputted to initialize the memory. When it is wanted to read data from the SAM, the terminal 1146 is switched to the input side through which the data stored in the SAM are inputted. The inputted data will be outputted from the field buffer controllers 90–96 as serial outputs puts D0–11. More particularly, the polygon identification number PN being output from the field buffer controller 90 is outputted toward the attribute RAM unit 38; the texture data TX and TY being outputs of the field buffer controllers 92 and 93 are outputted toward the texture data storage unit 42; the brightness data BRI being output of the field buffer controller 96 is outputted to the palette/mixer circuit 44 through the delay circuit 168.

FIG. 9 shows a sequence of writing data into the field buffer unit 40. As shown in FIG. 9, an image data is written into each polygon at each time when XPFIR=L. The addresses AI0–9 are controlled by using the XVW and XHW signals such that the data for every polygon will be written thereinto for one line.

(5) Attribute RAM Unit

As shown in FIG. 6, the attribute RAM unit 38 comprises an attribute RAM section 152 and an attribute data control section 150.

Attribute data inputted from the sorting unit 22, including palette number PAL, color Z value CZ, block number BN and so on, are inputted into the attribute data control unit 150. The palette number PAL is a number used to specify a palette table; the color Z value CZ is used to deal with variations in color depending on variations in depth; and the block number BN is used to specify a block in the memory space of the texture data storage unit 42. These attribute data have been stored in the attribute RAM 152 through the attribute control unit 150. The reading of data from the attribute RAM 152 is performed in accordance with the polygon identification numbers PN from the field buffer unit 40. The read data will then be supplied to the palette/mixer circuit 44 for every polygon.

The block numbers BN used to specify the blocks in the storage space of the texture data storage unit 42 are generated by the attribute control circuit 150 and then supplied to the texture storage unit 42.

(6) Texture Data Storage Unit (Rendering Data Storage Unit)

The texture data storage unit 42, as shown in FIG. 6, comprises a character code storage section 160 and a character generator 164. The texture data storage unit 42 has stored data (e.g. color codes) that are used to display an actual scene on the texture coordinates TX and TY from the field buffer unit 40. To aid the storage unit in speed, the texture data storage unit 42 is of two-stage structure. These storage units may be formed by any suitable memory means such as mask ROM, EEPROM, SRAM, DRAM or the like. If a RAM is particularly used to rewrite the contents of the RAM for every one field (1/60 seconds), a unique image effect may be obtained as by feeding back its own image and by monitoring back to the texture.

Figure 10:
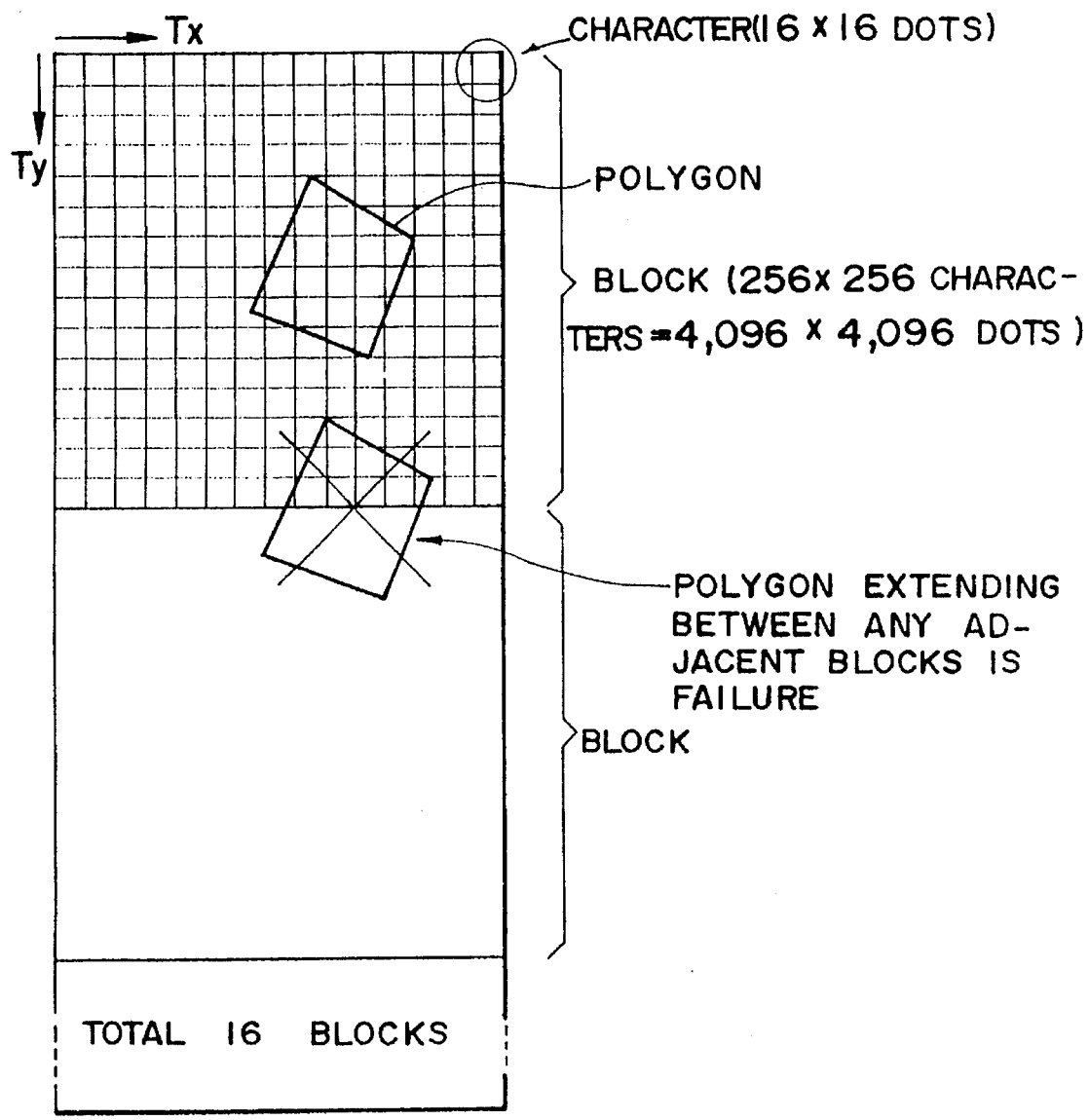
FIG. 10 is a schematic view illustrating the structure of a texture storage plane.

FIG. 10 shows a plane of texture storage that is defined by the texture data storage unit 42.

The texture storage plane is of such a stratum structure as shown in FIG. 10. This provides a larger texture storage plane realized by a smaller storage capacity. More particularly, the texture storage plane may be divided into 16 blocks each of which blocks is divided into 256×256 characters. Each of the characters is further divided into 16×16 dots and has stored a pattern used to define the texture storage plane. The texture storage plane is fully filled with such a pattern.

As shown in FIG. 10, the texturing to a polygon is performed by specifying vertex coordinates of the texture applied to that polygon. However, the polygon cannot be specified to extend between adjacent blocks.

Figure 11:
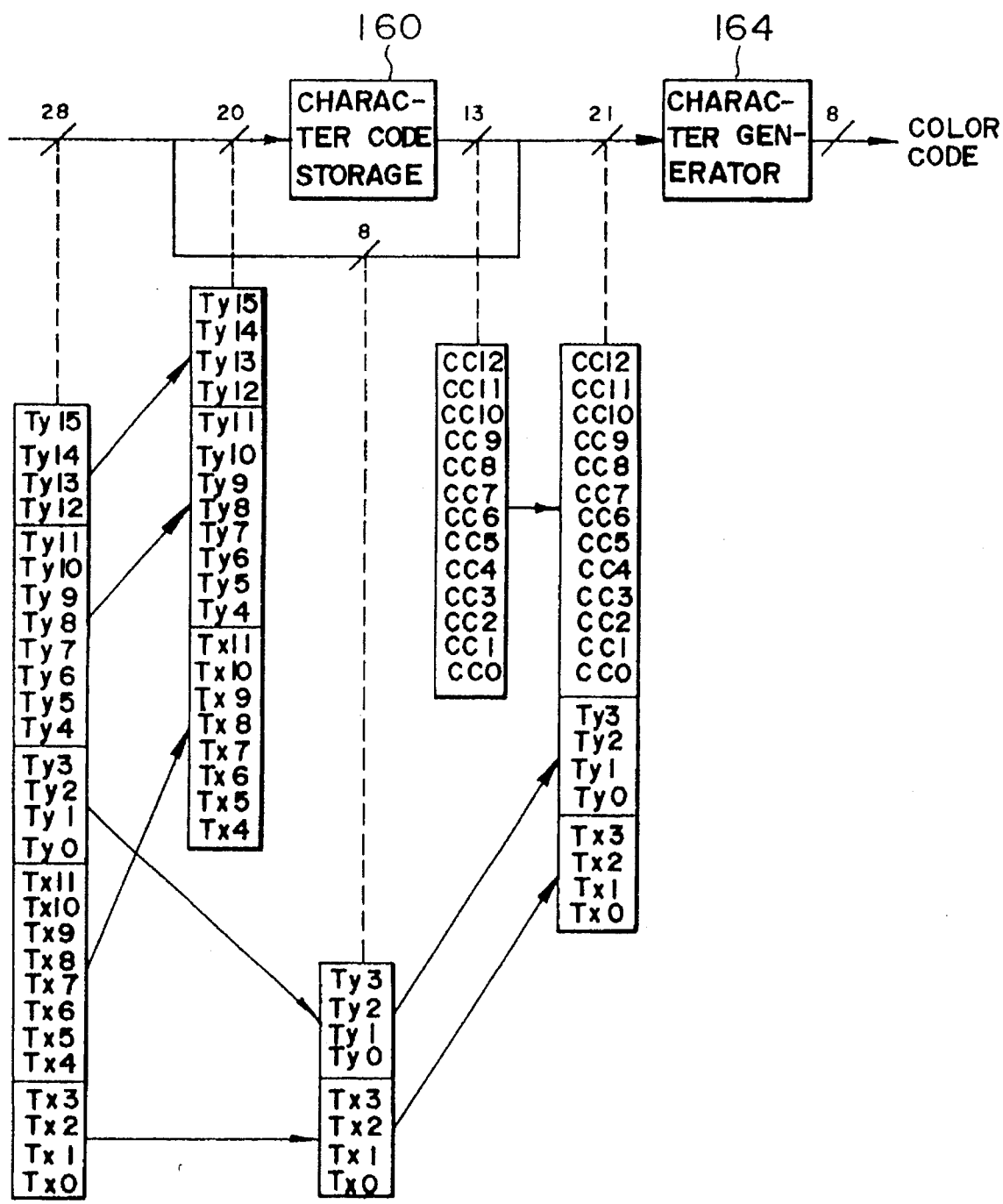
FIG. 11 is a schematic view illustrating the flow of data in the texture data storage unit.

FIG. 11 shows a flow of data in the texture data storage unit 42.

In the present embodiment, the texture data storage unit 42 receives a data of total 28 bits, including texture X coordinates TX0–TX11 of 12 bits and texture Y coordinates TY0–TY15 of 16 bits.

The low-order bits TX0–TX3 and TY0–TY3 in these texture coordinates are used to address characters in the character generator 164 while the high-order bits TY12–TY15 of the texture Y coordinates are used to specify block numbers BN in the texture storage plane. In other words, blocks in the texture storage plane are specified by the high-order bits TY12–TY15 while characters in each of the blocks are addressed by the bits TX4–TX11 and TY4–TY11. Thus, character codes CC0–CC12 will be read out from the character code storage section 160. On the other hand, the low-order bits TX0–TX3 and TY0–TY3 are joined directly with the character codes CC0–CC12 bypassing the character code storage section 160 and then supplied to the character generator 164. Subsequently, the character generator 164 will output an 8-bit color code which is the final output thereof to the palette/mixer circuit 44.

(7) Palette/Mixer Circuit

The palette/mixer circuit 44 is one that synthesizes RGB data used to output an image from the brightness data BRI, color data COL, palette numbers PAL and color Z values CZ. More particularly, an output image is synthesized by taking RGB data out of a preset palette using dot data stored in the field buffer unit 40 and polygon data stored in the attribute RAM 38. The palette has stored color data of total 24 bits including each RGB of 8 bits. The palette is totally divided into 128 banks which are addressed by palette numbers PAL. Each of the banks has data of 256 colors which are specified by color codes COL.

Figure 12:
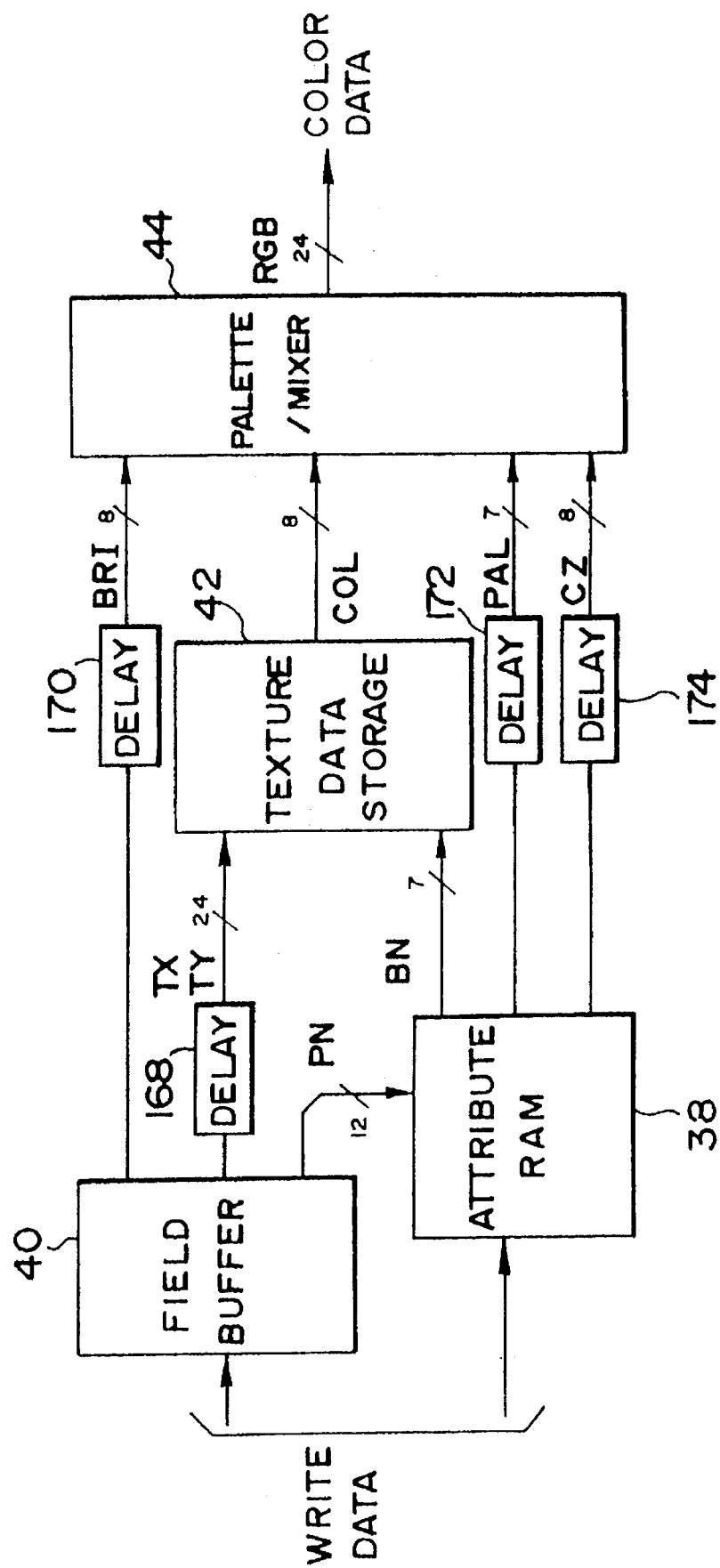
FIG. 12 is a block diagram illustrating the flow of data until an image is outputted after the data have been written to the field buffer unit.

FIG. 12 shows a flow of signal in a period after data have been written in the field buffer unit 40 and attribute RAM unit 38 and until a final image is outputted from the system.

① Data (PN, TX, TY, BRI) are outputted from the field buffer unit 40 for every one dot.

② Polygon data (BN, PAL, CZ) corresponding to said polygon identification number PN are outputted from the attribute data RAM unit 38.

③ The data TX, TY and BN are inputted into the texture data storage unit 42 which in turn outputs the corresponding color data COL. In this case, the data TX and TY are inputted into the texture data storage unit 42 through a delay circuit 168 to time with the input of the data BN through the attribute RAM unit 38.

④ The data COL, PAL, BRI and CZ are timed with each other by delay circuits 170, 172 and 174 so that these data will simultaneously be inputted into the palette/mixer circuit 44. A bank and color code therein in the palette are specified by PAL and COL to select one color data from the palette. The selected color data is computed in color by the values BRI and CZ. Thereafter, the color data is gamma corrected before D/A conversion. The converted color data is a RGB data which is outputted from the palette/mixer circuit 44 to the CRT 46 wherein an image is displayed.

(8) Subsampling(thinning)/Interpolation (A) Summary

As described, the present embodiment stores the texture coordinates in the field buffer unit 40, rather than the color data itself. This enables the image synthesization to use such a subsampling/interpolation technique as will be described below. As a result, the hardware can be increased in speed and reduced in scale.

The subsampling process relative to the texture coordinates and others is carried out at the processor unit 50. As shown in FIG. 1, the output from the field buffer unit 40 includes interpolation circuits 180, 182, 184 and 188 which are adapted to determine the texture coordinates and others of the ignored dots by subsampling and to read out the texture data from the texture data storage unit 42, through the interpolation. In such a case, the texture coordinates on the screen are non-linear data. However, by linearly interpolating such non-linear data by small sections, it is possible to obtain a high quality image without substantial deterioration.

Figure 13B:
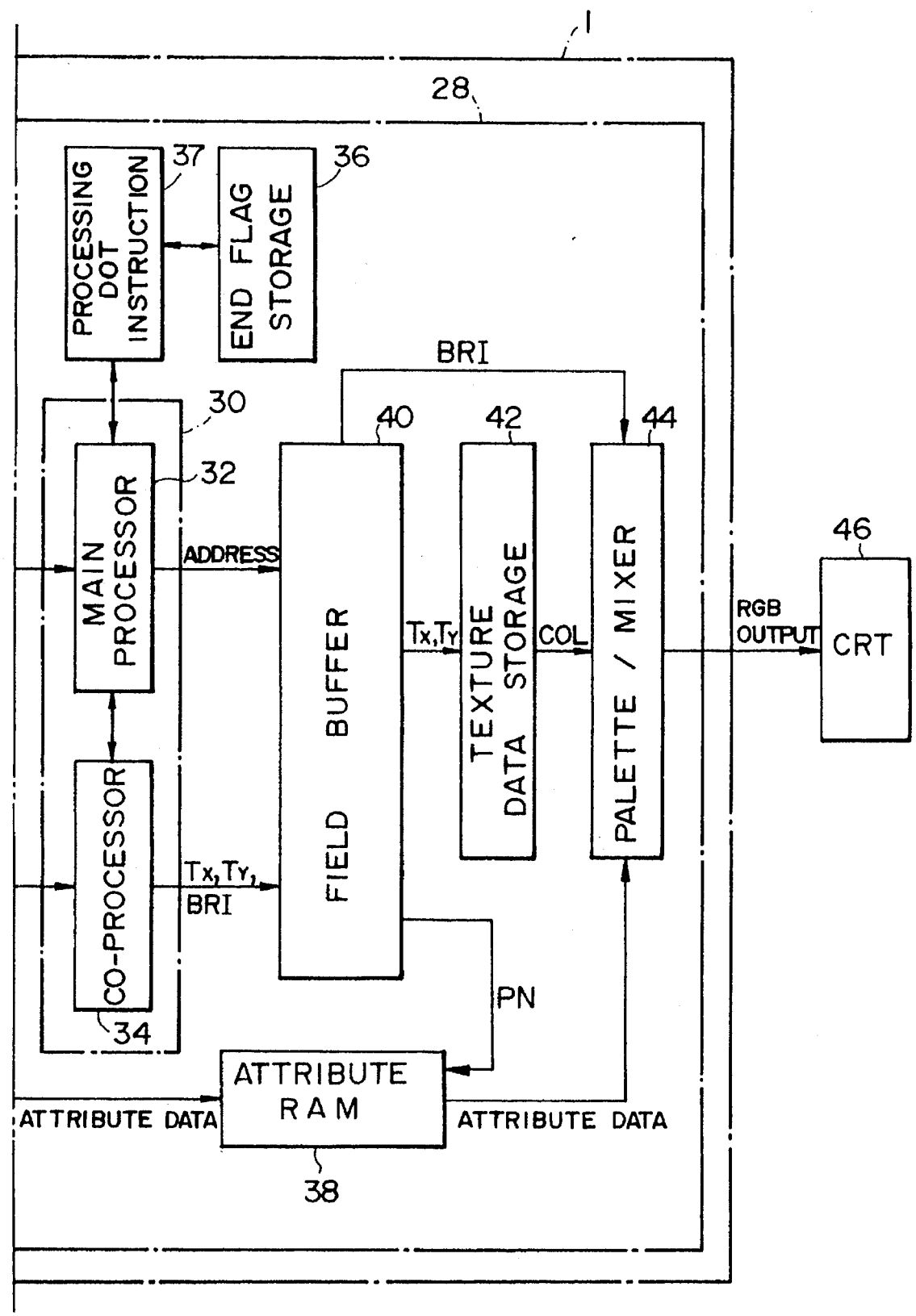
FIG. 13, comprised of FIGS. 13A–13B, is a block diagram showing an example of the image synthesizing system in which the subsampling/interpolation is not carried out.

As described, the present image synthesizing system can reduce the number of computations which required the most amount of data to one-half or less at each time when a data is subsampled, while maintaining the image quality very well. Thus, the hardware thereof can be increased in speed and reduced in scale. FIG. 13 shows a block diagram of the image synthesizing system when the subsampling/interpolation process is not carried out therein. As will be apparent from comparison between FIGS. 1 and 13, the present embodiment can provide a very simple technique as simply by adding the interpolation circuits 180–186.

The summary of this embodiment will now be described with respect to the subsampling/interpolation.

In the image synthesizing system shown in FIG. 1, the subsampling means is included in the processor unit 30. More particularly, the subsampling process is realized by subsampling dots on scan lines when they are computed by the processor unit 30. The subsampling process is executed, for example, according to such a rule shown in FIG. 14.

The subsampling process is carried out for each dot in the horizontal direction (X direction), for example, for each dot in which X is an even number. However, the following dots will not be ignored by subsampling:

① Dots representing the outline of a polygon;
② Dots on the boundary between adjacent polygons; and
③ Dots on left and right side of the scene.

Figure 14:
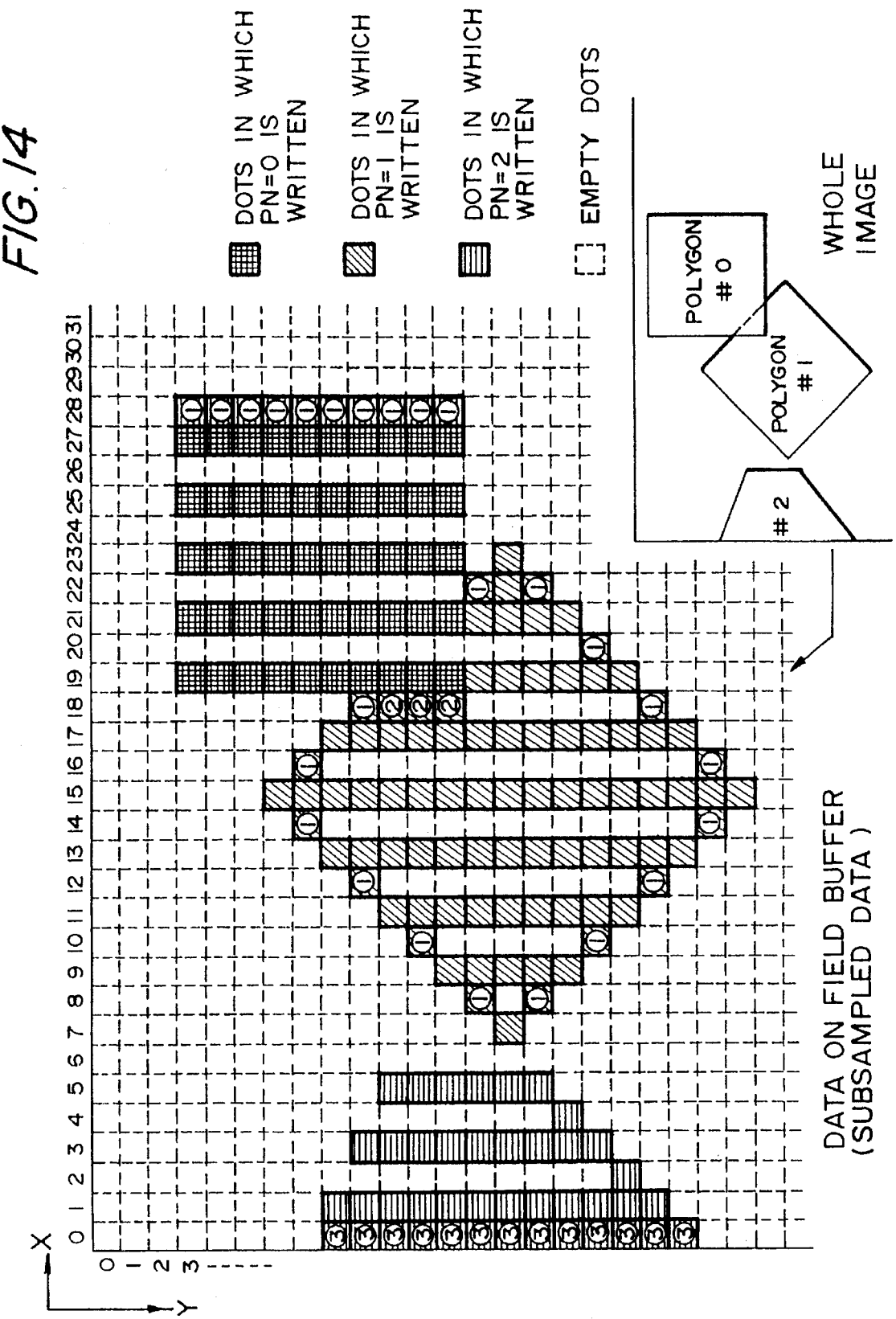
FIG. 14 is a schematic view exemplifying subsampled data on the subsampled field buffer unit.

Images from subsampled data on the field buffer according to the above rule are shown in FIG. 14. As shown in this figure, does corresponding to those described in the above items ①–③ are not ignored by subsampling, with the other dots being ignored by subsampling for every dot.

Empty dots are dots ignored by subsampling according to the above rule or background dots which are not used to draw the polygon. Empty dots are set, for example, at TX=TY=FFFh. When the data for one scene begin to be written, all the dots in the field buffer are cleared (all bets are set to be 1) and the value of FFFh will be set at all the dots.

The interpolation means will now be described. The interpolation means in this embodiment is realized by connecting the interpolation circuits 180, 182, 184 and 186 to output of the field buffer unit 40, as shown in FIG. 1. One of the interpolation circuits 180 is used to interpolate the polygon identification number PN; two other interpolation circuits 182 and 184 are used to interpolate the texture coordinates TX and TY. The last interpolation circuit 186 is used to interpolate the brightness data BRI. More particularly, the operations of these interpolation circuits 180–186 are carried out, for example, according to the following rule as shown in FIG. 15.

The interpolation is performed to the following dots:

① Empty dots (i.e., TX=TY=FFFh) and also
② Dots adjacent to the empty dots, which have the same identification number and are not empty dots.

The interpolation is carried out by applying the following process to the empty dots above:

① The polygon identification number PN of the empty dots are changed to the same PN as in the adjacent dots.
② The texture coordinates TX, TY and brightness data BRI are set to be an average value between the data TX, TY and BRI in the adjacent dots.

FIG. 15 shows an interpolation carried out according to the above rule. As shown in FIG. 15, the interpolation is performed to empty dots which are surrounded by dots having the same polygon identification number PN. Namely, in FIG. 5, the interpolation is executed for dots which are empty dots and which are adjacent to dots that have the polygon identification number PN of "0". On the contrary, the interpolation will not be made to dots which are empty, but adjacent co dots having different polygon identification numbers PN, because it is judged that such dots are not ignored dots by subsampling and judged to be space between adjacent polygons.

As shown in FIG. 15, the following interpolation is performed on dots to be interpolated. First, the interpolation circuit 180 sets the polygon identification number of empty dots that is the same polygon identification number PN as in the adjacent dots. In this example, there is set to be PN=0.

The interpolation circuits 182 and 184 determine, for example, an average value between the texture coordinates TX and TY of the adjacent dots to the empty dot. This value is set as the texture coordinates TX and TY in that empty dot. In this example, values of TX=150 and TY=30 will be set.

Similarly, the interpolation circuit 186 determines, for example, an average value between the brightness data BRI of the adjacent dots. This value is set as the brightness data BRI at the empty dot. In this example, a value of BRI=48 will be set.

The details of the present embodiment for performing the subsampling/interpolation will now be described on arrangement and operation.

(B) Details of Subsampling Means

The subsampling process in this embodiment is carried out when each dot on the scan lines shown in FIGS. 4D and 4H is computed. This is accomplished by changing the count-up value of X coordinate when each dot on the scan line is computed. For example, if the rate of subsampling is to be one-half, this count-up value is two. If the rate of subsampling is to be one-third, the count-up value may be three. Thus, the computation for dots on the scan line will be performed for every set of two or three dots. This enables the subsampling process to be carried out.

Although this embodiment has been described as to the subsampling carried out when each dot on the scan line is computed, the present invention is not limited to it. For example, the subsampling process may be carried out on computing outline points shown in FIGS. 4C and 4G. In such a case, the rate of subsampling can be changed by changing the count-up of Y coordinate when the outline points are computed.

(C) Details of Interpolation Means

Figure 16:
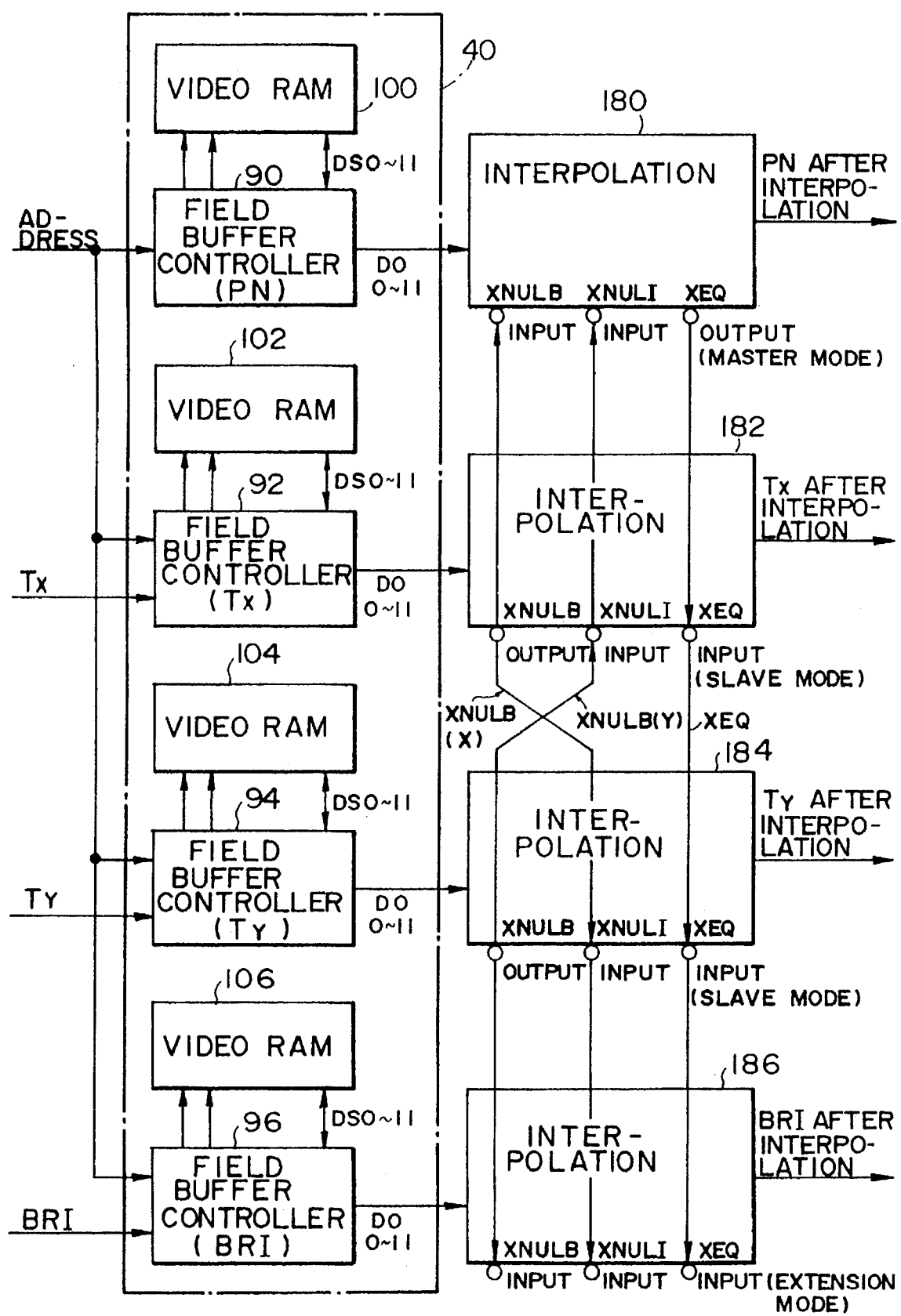
FIG. 16 is a block diagram showing the concrete circuit form of the present embodiment for carrying out the sub sampling/interpolation.
Figure 17B:
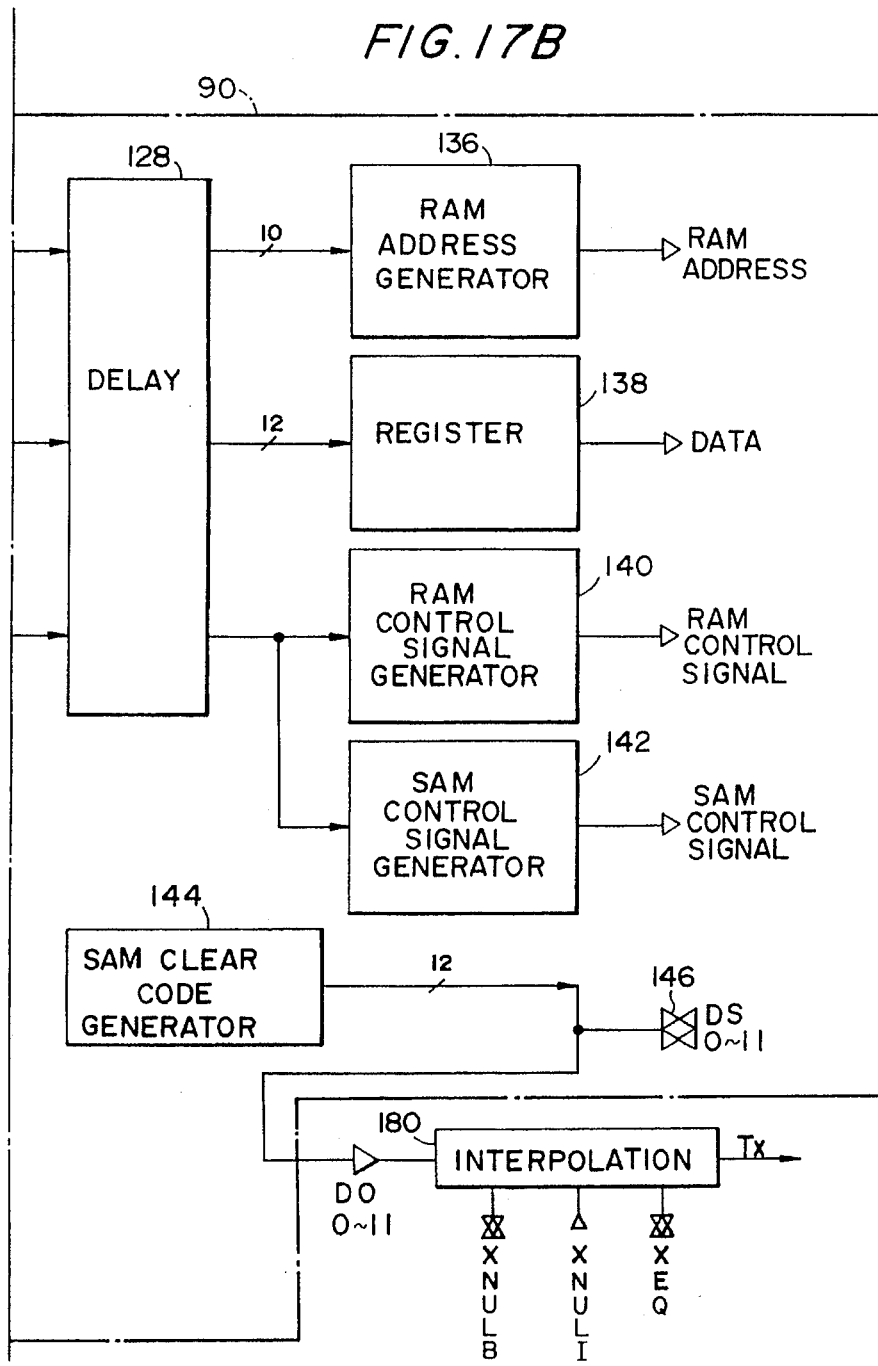
FIG. 17, comprised of FIGS. 17A–17B, is a block diagram showing the concrete connection between the field buffer controller and the interpolation circuit.
Figure 18:
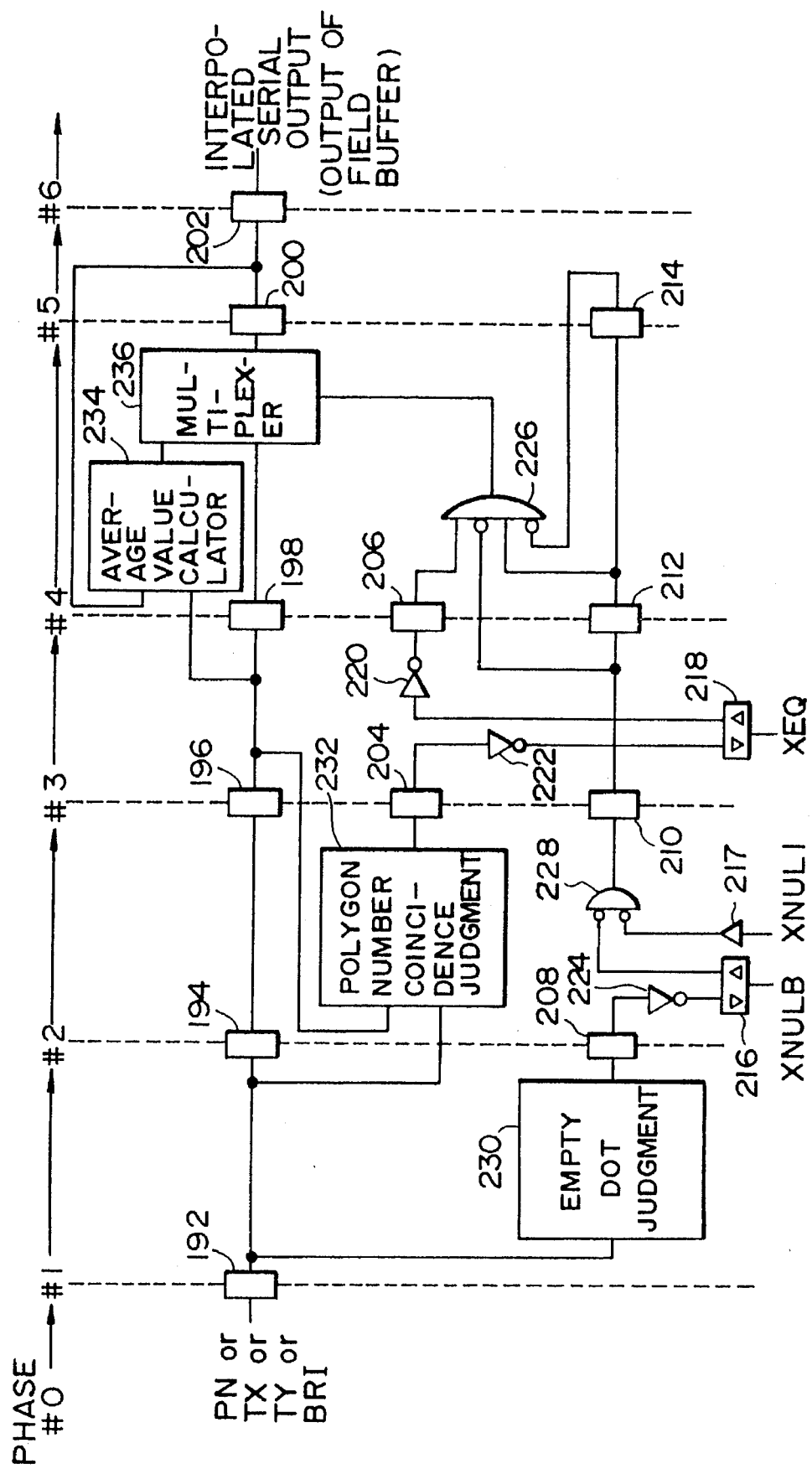
FIG. 18 a block diagram showing the internal circuits of the interpolation circuit.

As described, the interpolation means in the present embodiment is defined by providing the interpolation circuits 180–186 in the output of the field buffer unit 40. FIG. 16 shows the relationship between the video RAMs 100–106, field buffer controllers 90–96 and interpolation circuits 180–186 which are connected together in this embodiment. FIG. 17 shows the relationship between the PN field buffer controller 90 and PN interpolation circuit 180 connected to each other (the connection between the TX, TY and BRI field buffer controllers 92, 94, 96 and the interpolation circuits 182, 184, 186 being in the similar relationship). FIG. 18 shows an internal circuitry in each of the interpolation circuits 180–186.

As shown in FIG. 1B, the writing operation of this embodiment to the video RAMs 100–106 is carried out by randomly writing data through the field buffer controllers 90–96 in response to a given address signal. On the other hand, the reading operation of data from the video RAMs 100–106 is carried out by serially reading data through DS0–11 terminals in synchronism with dot clocks. In such a case, data inputted from the bi-directional buffers DS0–11 of the field buffer controller 90 are serially outputted toward the interpolation circuit 180 through the outputs DO0–11, as shown in FIG. 17. Similarly, data are serially outputted from the outputs DO0–11 of the field buffer controllers 92–96 toward the interpolation circuits 182–186. In this case, the interpolation circuits 180–186 are formed into the same structure as shown in FIG. 18. The control between the respective interpolation circuits 180–186 will be carried out through XNULB, XNULI, XEQ terminals.

In the internal circuit of each of the interpolation circuits 180–186 shown in FIG. 18, registers 192–214 have a data holding/shifting function. Logic circuits 220, 222, 224, 226 and 228 function to perform logical computations such as NOR and others. An empty dot judging circuit 230 is used to judge whether or not a dot to be processed is empty dot. A polygon number coincidence judgment circuit 232 is used to judge whether or not dots adjacent to the dot to be processed have the same polygon identification number PN. An average value computing circuit 234 is used to determine average values between the texture coordinates TX, TY and brightness data BRI of the adjacent dots when the interpolation is carried out. A multiplexer 236 is used to select one of the interpolated and original data to be outputted.

As described, in this embodiment, the field buffer controller 90 for handling the polygon identification numbers PN is used in the master mode; the field buffer controllers 92 and 94 for handling the texture coordinates TX and TY are used in the slave mode; and the field buffer controller 96 for handling the brightness data BRI is used in the extension mode. The XNULB and XEQ terminals of the interpolation circuits 180–186 which are bi-directional buffers are used as output or input terminals depending on the respective mode, as shown in FIG. 16. More particularly, the XNULB terminal of the interpolation circuit 180 (master mode) becomes an input terminal and the XEQ terminal becomes an output terminal. The XNULB and XEQ terminals of the interpolation circuits 182 and 184 (slave mode) become output and input terminals, respectively. Both the XNULB and XEQ terminals of the interpolation circuit 186 (extension mode) become input terminals. Further, the XNULI terminals in all the interpolation circuits 180–186 are used as input terminals.

In order to perform the interpolation as shown in FIG. 15, the values PN, TX, TY and BRI of dots before and behind a dot to be interpolated must be referred to. Therefore, signals used to perform a communication between the interpolation circuits 180–186 are required. The interpolation control signals XNULB, XNULI and XEQ can be used as such signals.

As shown in FIG. 18, the XNULB terminal 216 is a bi-directional buffer. The interpolation circuit 182 in the slave mode outputs a signal representing whether or not the value TX of a dot to be processed is FFFH, as an XULB signal (which will be referred to "XNULB (X) signal" hereinafter). Similarly, the interpolation circuit 184 also outputs a signal representing whether or not the value TY is FFFH as an XNUB signal (which will be referred to "XNULB (Y)" signal hereinafter). Whether or not the TX or TY is FFFH is judged by an empty dot judging circuit 230. When TY=FFFH, the XNULB (X) signal becomes "0". When TY=FFFH, the XNULB (Y) signal becomes "0". If both XNULB (X) and XNULB (Y) signals are "0", it is judged that that dot is an empty dot.

As shown in FIG. 16, the XNULB (X) signal which is the output signal of the interpolation circuit 182 is inputted into the XNULB terminal of the interpolation circuit 180 and into the XNULBI terminals of the interpolation circuits 184 and 186. Similarly, the XNULB (Y) signal which is the output signal of the interpolation circuit 184 is inputted into the XNULI terminals of the interpolation circuit 180 and 182 and into the XNULB terminal of the interpolation circuit 186. Therefore, the logic circuits 228 of the interpolation circuits 180–186 shown in FIG. 18 will receive the XNULB (X) and XNULB (Y) signals through the XNULB and XNULI terminals. As a result, the output of the logic circuit 228 becomes "1" when both XNULB (X) and XNULB (Y) signals are "0", that is, when it is judged that the dot to be processed is an empty dot. The output of this logic circuit 228 is then transmitted to registers 212, 214, logic circuit 226 and others.

The XEQ terminal 218 also is a bi-directional buffer. In the master mode, the interpolation circuit 180 outputs a signal showing whether or not dots adjacent to that to be processed have the same polygon identification number as an XEQ signal. More particularly, the polygon identification numbers PN of the dots held in the registers 192 and 196 are inputted into the polygon number coincidence judgment circuit 232. If there is a coincidence, the output of the XEQ terminal becomes "0".

In the slave and extension modes, the XEQ terminals 218 of the interpolation circuits 182–186 are input terminals. As shown in FIG. 16, the XEQ signal which is output of the interpolation circuit 180 is inputted into the interpolation circuits 182–186. Thus, they will be informed whether or not the polygon identification numbers PN off the dots adjacent to the dot to be processed is coincide with each other. If the polygon identification numbers PN of the adjacent dots are coincide with each other, the output of the XEQ terminal of the interpolation circuit 180 becomes "0" and then inputted into inverters 220 in the interpolation circuits 180–186. The outputs of the inverters 220 will be inputted into register 206 and logic circuit 226.

If a dot to be processed is an empty dot and when the polygon identification numbers PN of not-empty dots adjacent to that dot are coincide with each other, it is judged that that dot should be interpolated. Thus, the output of the logic circuit 226 in FIG. 18 becomes "1" and the multiplexer 236 selects the output of the average value computing circuit 234, rather than the output of the register 198. As a result, the average values off PN, TX, TY and BRI which have been held in the registers 196 and 200 are calculated to compute the interpolation data. In this case, further, the calculation of average value at the adjacent dots is equivalent to the setting of the same polygon identification number PN as in the adjacent dots because the polygon identification numbers PN of the adjacent dots are coincide with each other. In this embodiment, thus, the interpolation of the polygon identification number PN, texture coordinates TX, TY and brightness data BRI can be carried out through the interpolation circuits of the same circuit arrangement.

FIG. 19 shows data which are read out from the video RAMs and interpolated by the field buffer controllers before they are outputted therefrom.

As shown in FIG. 19, the present embodiment performs the interpolation in a pipe-line manner through seven phases (#0–#6) which will be described below:

0 SAM Reading Phase

On rising of SAM reading clock SC, the corresponding dot data is outputted From the multi-pot video

1 SAM Data Taking Phase

Data reaching DS0–11 are taken in the field buffer controllers 90–96 and interpolation circuits 180–186 in synchronism with the clock SC.

2 Empty Dot Judgment Phase

The interpolation circuits 182 and 184 (slave mode) check whether or not the values of TX and TY are FFFh and outputs XNULB signals.

3 Subsampled Dot Judgment Phase

The interpolation circuit 180 (master mode) compares the polygon identification numbers PN in the adjacent dots with each other and outputs an XEQ signal representing whether or not there is a coincidence.

4 and #5 Interpolation Phase

Interpolation of the polygon identification number PN, texture coordinates TX, TY and brightness data BRI is carried out by determining an average value between adjacent dots. With respect to dots which are not interpolated, however, the multiplexer 236 permits the data to pass therethrough without any treatment.

6 Data Output Phase

Data is outputted in synchronism with the rising of dot clock DCK.

Items ① to ⑤ in FIG. 19 represent the following matters:

① Data is read out from the video RAM through the rising of SC (Phase #0);

② Data is taken in the field buffer controllers 90–96 and interpolation circuits 180–186 (Phase #1);

③ XNULB corresponding to data (C) is outputted (Phase #2);

④ XEQ corresponding to data (C) is outputted (Phase #3); and

⑤ The interpolated data is outputted.

(9) Logic-Arithmetic Circuit usable as Texture Data Storage Unit

The texture data storage unit is not limited to the storage means for texture data like ROM or RAM, but may be realized in the form of a function for inputs such as texture coordinates or the like. In such a case, the texture data storage unit may be Formed as a logic-arithmetic circuit.

Figure 20A:
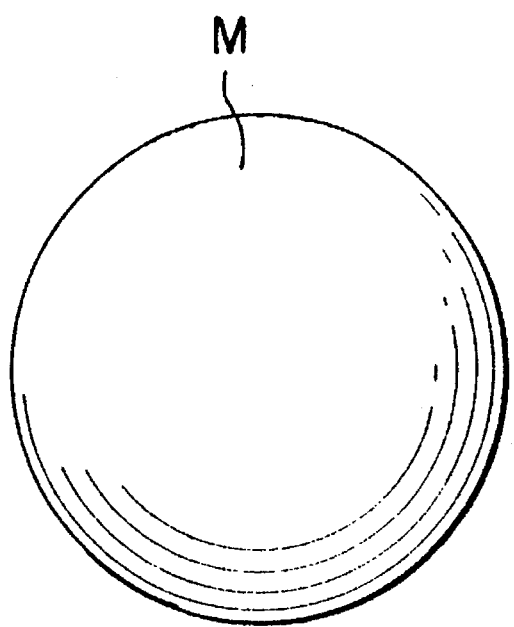
FIG. 20 is a schematic view illustrating the bump mapping.
Figure 20B:
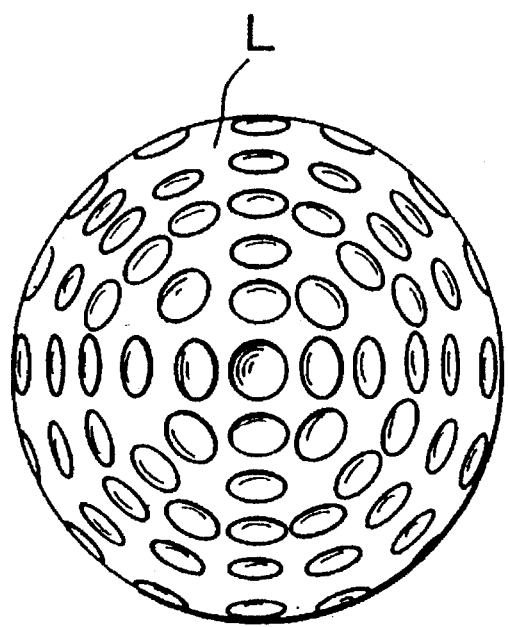

Color data have been described as texture data applied to the polygons. The present invention is not limited to texture data, but may be applied to all kinds of rendering data which can be applied to the polygons. For example, surface shape data may be applied to the polygons. That mapping technique is known as bump mapping. According to the technique, a crater-like mapping as shown by L may be carried out relative to a 3-D object M as shown in FIG. 20.

The bump mapping is also called perturbation mapping which has perturbation components (which are frequently displacements of normal vectors) relative to the surface shape of an article as texture data. The texture data comprising the perturbation components will be referred to bump. Texture coordinates used to read out the bump texture data will be referred to bump texture coordinates BX and BY.

Figure 21:
FIG. 21 is a schematic view illustrating the concept of the perturbation bump mapping.

The present embodiment has "a normal vector on the polygon surface" as a kind of attribute data (constant for each polygon). The "normal vector on the polygon surface" is subjected to perturbation for every dot through the perturbation components. Thus, a normal vector N for each dot will be determined. This manner is shown in FIG. 21.

When the normal vector for each dot is determined, the brightness data BRI for each dot is determined based on the normal vector data. In such a case, a lighting model is required to determine the brightness data BRI from the normal vector for each dot.

In the present embodiment, the lighting model includes parallel rays from a single light source, specular reflection, diffuse reflection and ambient light. The lighting model may be computed by the use of the following formula that is called a shading function and obtained theoretically in part but empirically in part:

$$BRI = IaKa + \{Il/(Z+K)\} \times (Kd \cos \phi + Ks \cos^n \psi) \quad (1)$$

where

BRI: Brightness data for each dot;

Ia: Intensity of ambient light;

Il: Intensity of incident light;

Ka: Diffuse reflection coefficient of ambient light [O];

Kd: Diffuse reflection coefficient [O];

Ks: Specular reflection coefficient [O];
 (a: ambient)
 (d: diffuse)
 (s: specular)

K: Constant (for correcting the brightness in a less distant object) [F];

Z: Z-axis coordinate for each dot [O in certain cases];

$\phi$: Angle between a light source vector L and a normal vector N;

=Angle between a reflective light vector R and a normal vector N;

$\psi$: Angle between a reflective light vector R and a visual vector E=[0, 0, 1]; and n: Constant (sharpness in high-light) [O]
 [F]: Constant for each scene (field).
 [O]: Constant for each object (or polygon).

The angles $\phi$ and $\psi$ in the formula (1) are determined using the normal vectors N determined by the interpolation. If necessary, Z-axis coordinates may be determined for each dot. The other coefficients are given as attribute data for each polygon. When these data are substituted into the formula (1), brightness data for each dot will be determined.

Thus, by determining the brightness data for each dot and also determining the color data on this brightness data for each dot, an image in which crater-like forms are applied to the surface of an article can be synthesized, as shown in FIG. 20.

When such a bump mapping is used, the surface shape data of the article, such as normal vector data or normal vector perturbation components, will be stored in the texture data storage unit. The surface shape data will be read out through the bump texture coordinates. However, the present embodiment is not limited to this case, but may be used to apply a given function computation to the bump texture coordinates to determine the surface shape data for each dot.

Figure 22A:
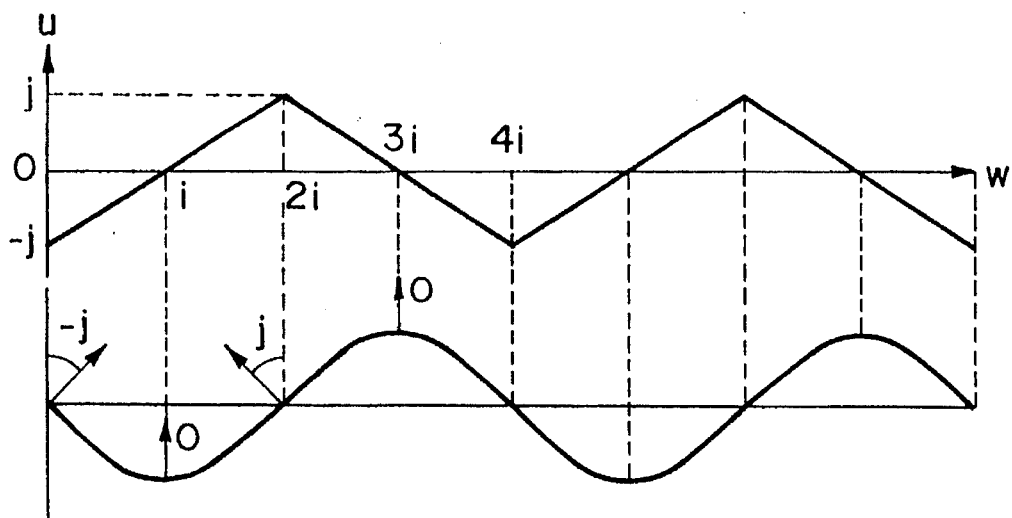
FIGS. 22A–22C are schematic views illustrating a texture data storage unit which is formed by a logic-arithmetic circuit.

Since a zigzag-shaped function as shown in FIG. 22A is a complex of linear functions, the zigzag-shaped function can be expressed by:

$$u = \begin{pmatrix} +\{(j/i) \cdot (w \bmod 2i) - j\} \ ((w \bmod 4i) < 2i) \\ -\{(j/i) \cdot (w \bmod 2i) - j\} \ ((w \bmod 4i) \geq 2i) \end{pmatrix}$$

where w is bump texture coordinate (Bx, By); u is perturbation component ($\alpha$, $\beta$); and i and j are constants (a mod b means a remainder in division a/b). This function can generate the surface shape of a pseudo sin curve. The function has various uses since it is the most basic bump. The function may be applied to both the bump texture coordinates Bx and/or By.

Figure 22B:
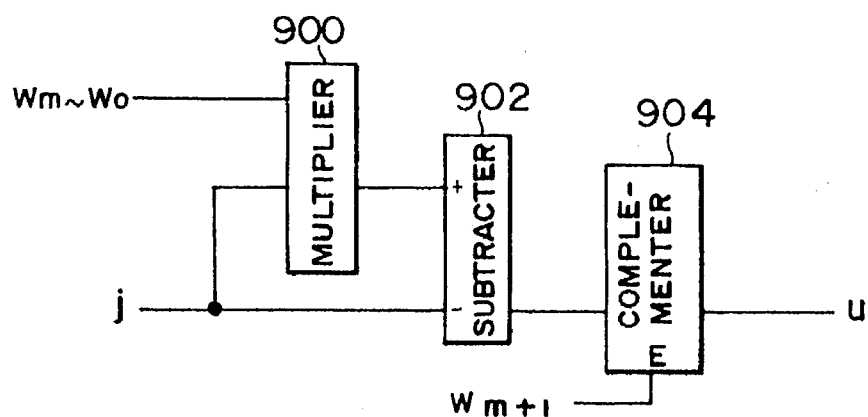

If the constant i is a multiple of 2, there may be realized a circuit comprising such multiplier 900, subtracter 902 and complementer 904 as shown in FIG. 22B.

Then $W_m - W_0$ (low order m+1 bits of W) and j are inputted to the multiplier 900. And low order m bits of the multiplier 900 output is rounded off before being inputted to the subtracter 902. An output of the subtracter 902 is inputted to the complementer 904 which has $W_{m+1}$ (bit m+1 of W) as an E input.

Figure 22C:
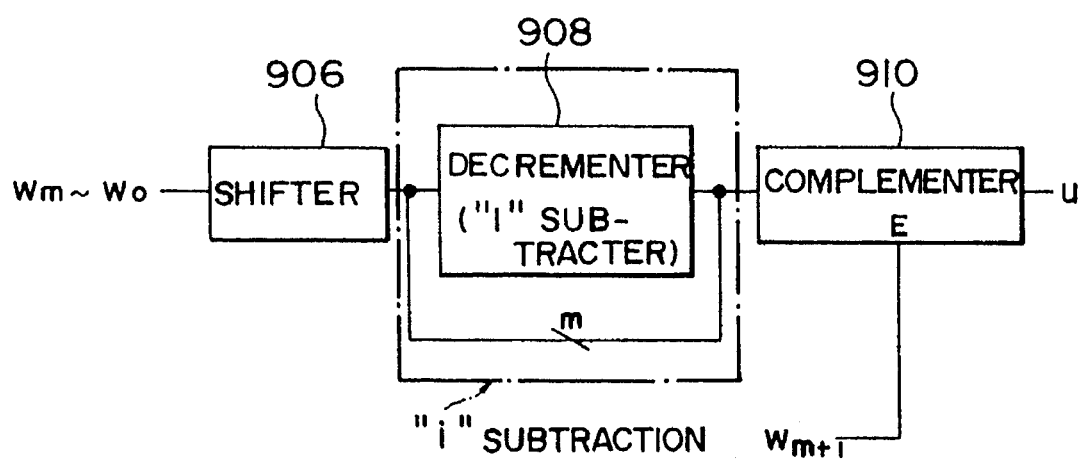

If the constant j is also a multiple of 2, the circuit may further be simplified as shown in FIG. 22C. Such a circuit comprises a shifter 906, a decrementer 908 and a complementer 910. $W_m - W_0$ (low order m+1 bits of W) are inputted to the shifter 906, which operates to fix the input to one of the following three conditions.

i<j (m<n): add (j−i) number of bits of "0" as low order bits (leftward shifting)

i=J (m=n): no action i>j (m>n): delete (i−j) number of low order bits (rightward shifting)

An output of the shifter 906 is inputted to the decrementer 908 except for the lowest order m bits, which will be inputted to the complementer 910 bypassing the decrementer 908. An E input of the complementer 910 has $W_{m+1}$ (bit m+1 of W) inputted.

The shifter 906 is not an active circuit, but merely one that is expressed by drawing difference wirings of the respective bits into a black box. If the attribute data contains the depth data BDEPTH of the bumps, the circuit shown in FIG. 22C is sufficient to accomplish the objects of the present invention.

Figure 23A:
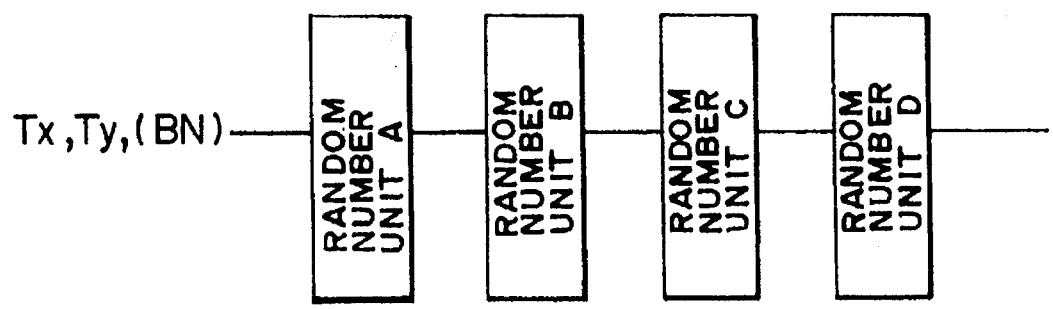
Figure 23B:
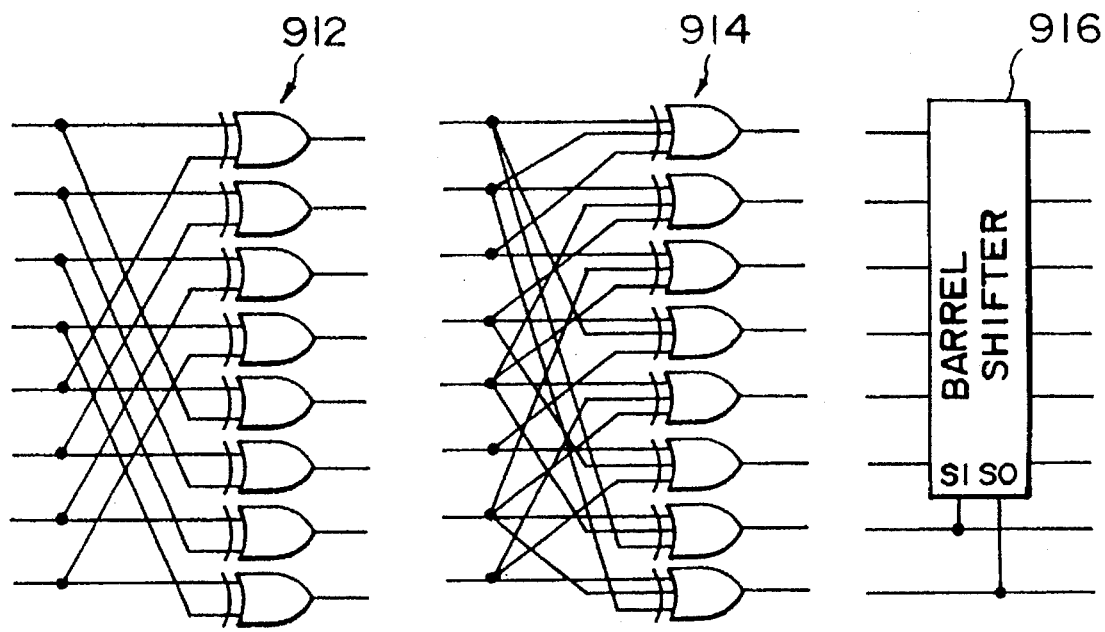
Figure 24:
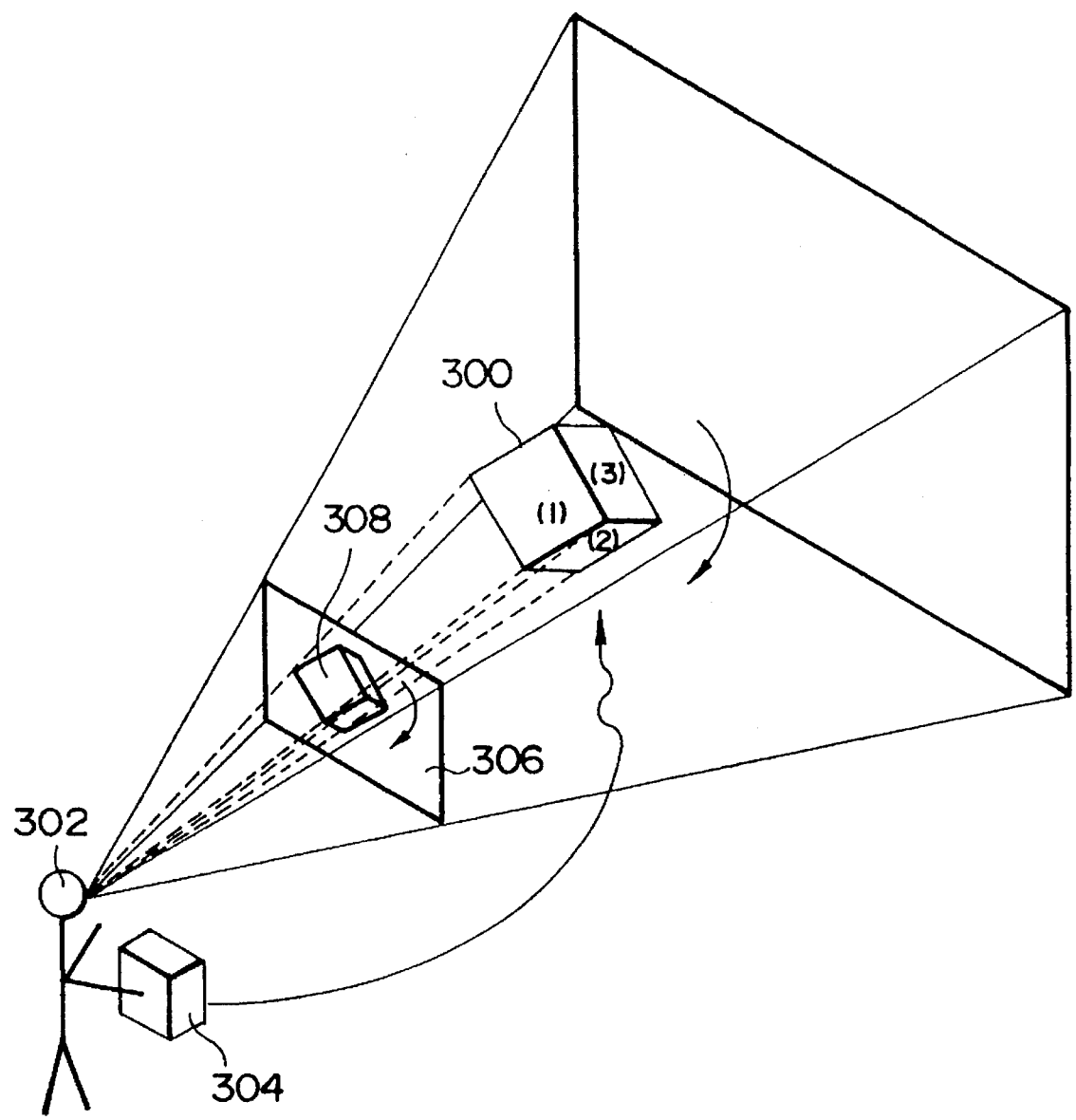
FIG. 24 is a schematic view illustrating the concept of an image processing system constructed in accordance with the prior art.
Figure 25:
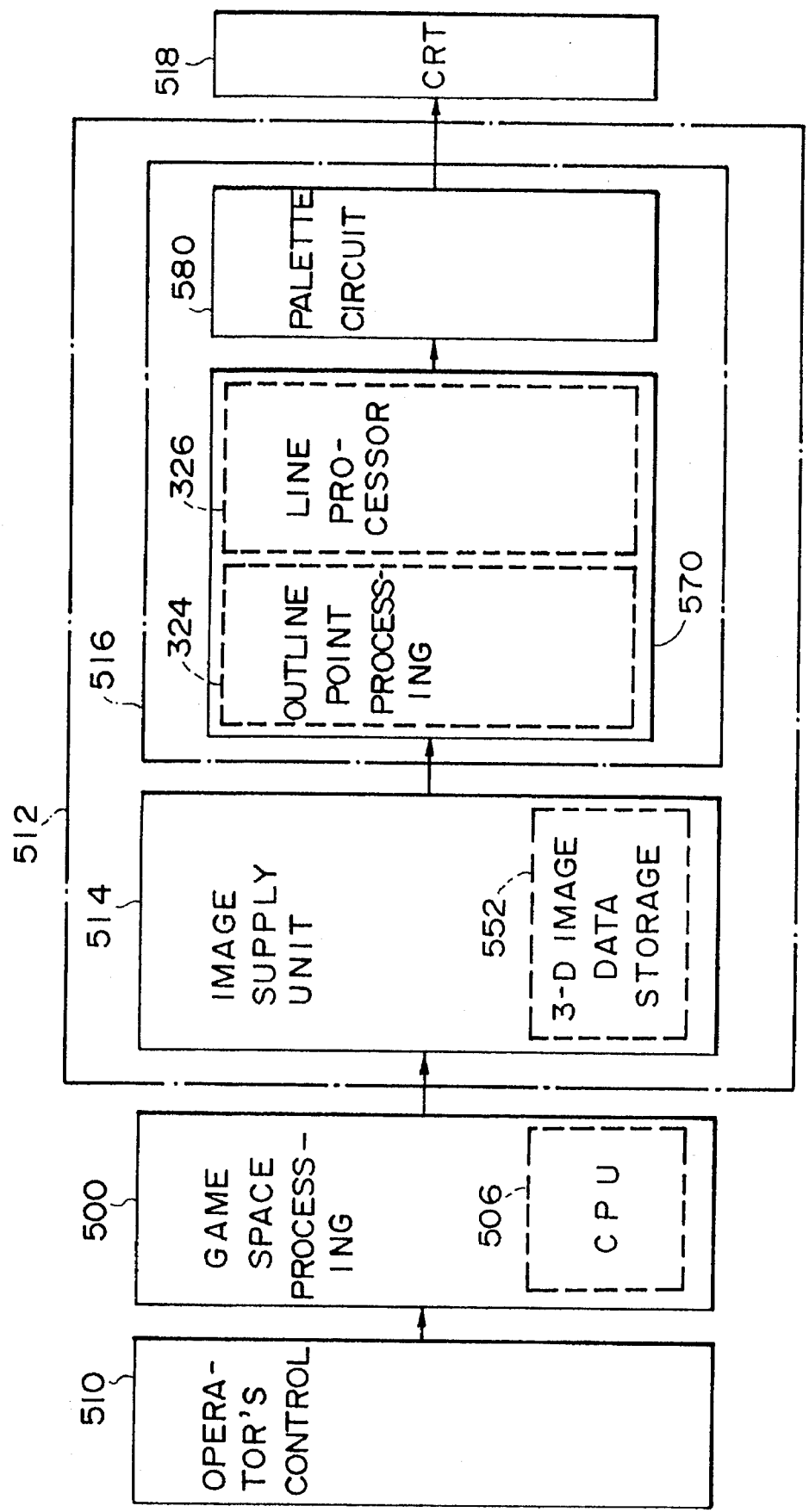
FIG. 25 is a block diagram of an image processing system constructed in accordance with the prior art.
Figure 26:
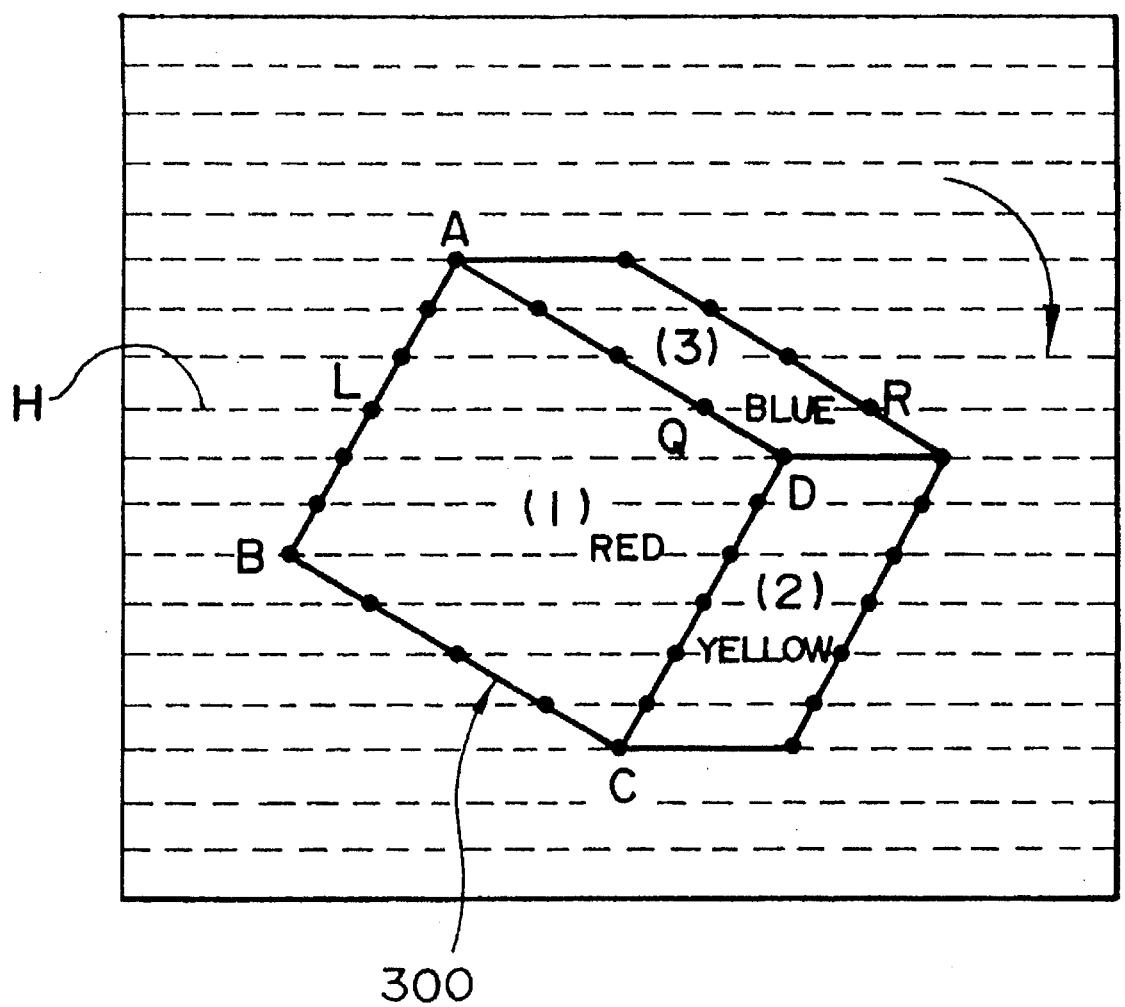
FIG. 26 is a schematic view illustrating a pseudo 3-D image projected onto a screen.

One of the simple and very useful elements is a random number generator which generates uniformized pseudo random numbers relative to the input of texture coordinates or the like. This is shown in FIG. 23A. The random number generating circuit is united to provide a multi-stage structure consisting of random number units A–D. As shown in FIG. 23B, various random number units 912, 914, 916 may be selected to find an appropriate bump pattern.

The present invention is not limited to the aforementioned embodiments, but may be carried out in various changes and modifications within the scope of the invention.

For example, the storage device defining the texture data storage means can be replaced by any one of various types such as EEPROM, SRAM, DRAM, mask ROM and the like.

The texture data (rendering data) stored in the texture data storage unit may be in any form of various data such as color data, surface shape data, brightness data, transparency data, diffuse-reflectance data and the like. For example, when the transparency data is used as the rendering data, a misty object can be represented such that part off the object changes from transparent to semi- transparent and from semi-transparent to transparent. When diffuse-reflectance data is used as the rendering data, an object having different glossy parts can be represented. There may further be used a technique described in SHIBAMOTO Takeshi and KOBAYASHI Makoto, *"Texture Mapping (1)" in the collected papers of Thirty-First Information Processing Institute Lecture*, Sep. 9, 1985. Such a technique subjects the perspective-transformed representing coordinates for each vertex in a polygon to an inverse perspective-transformation such that they are returned to their original states. Based on the texture coordinate corresponding to each vertex, a "transformation matrix" is determined that transforms the representing coordinates before being perspective-transformed into texture coordinates. The respective texture coordinates for every dot on the polygon are inversely perspective-transformed and the texture coordinates are determined by the transformation matrix.

The rate off subsampling in the subsampling/interpolation means is not limited to one-half, but may be any of one-third, one-fourth and so on. In that case, interpolation in the interpolation means is carried out for a plurality of does such as two dots or three dots. The "dots adjacent to dots to be processed" mean a left-hand dot adjacent to the leftward-most dot among the dots to be processed and a right-hand dot adjacent to the right-ward-most dot. In such a case, the subsampling/interpolation means may use a linear interpolation or the like.

The shape off the texture mapped on a polygon is not limited to the same or substantially the same configuration as that of the polygon, but may be mapped in any one of various configurations. For example, by mapping a texture completely different in shape from a polygon, a special image effect such as distorted texture can be provided.

Although the embodiments have been described without any particular distinction between "scan line in computation" and "CRT scan Line", these scan lines may be different from each other and, for example, intersect with each other, depending on the limitation on hardware such as SAM capacity of the video RAM or the like.

We claim:

1. An image synthesizing system for perspective-transforming a three-dimensional image consisting of a plurality of polygons onto a projection plane to synthesize a pseudo three-dimensional image, said image synthesizing system comprising:

a processor unit, responsive to image data of vertices of the plurality of the polygons, for determining positional coordinates of a plurality of dots for each of the polygons and a plurality of texture coordinates corresponding to the positional coordinates of each of said plurality of dots, a field buffer unit for storing said plurality of texture coordinates determined by said processor unit at an address specified by said positional coordinates of each of said plurality of dots, a rendering data storage unit for storing rendering data at an address specified by said texture coordinates, and an image data forming unit for reading said texture coordinates from said field buffer unit and for forming image data representative of the pseudo three-dimensional image by reading the rendering data from said rendering data storage unit based on the texture coordinates read from said field buffer unit, said processor unit including a subsampling unit for computing positional coordinates of a plurality of sub-sampled dots and corresponding plurality of texture coordinates, said image data forming unit including an interpolation unit for interpolating texture coordinates of an ignored dot ignored by subsampling, based on the texture coordinates of dots adjacent to the ignored dot stored in said field buffer unit.

2. An image synthesizing system as defined in claim 1, wherein said processor unit further determines brightness data corresponding to the positional coordinates of each of said dots responsive to the image data of vertices of the plurality of polygons, said field buffer unit further stores said brightness data determined by said processor unit at an address specified by said positional coordinates of each of said dots, and said interpolation unit interpolates the brightness data of the ignored dot based on the brightness data of said dots adjacent to the ignored dot stored in said field buffer unit.

3. An image synthesizing system as defined in claim 2, wherein the interpolation unit linearly interpolates the texture coordinates of said dots adjacent to the ignored dot.

4. An image synthesizing system as defined in claim 2, wherein the subsampling unit does not ignore a dot on the polygon outline or on a boundary between adjacent polygons.

5. An image synthesizing system as defined in claim 4, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

6. An image synthesizing system as defined in claim 2, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

7. An image synthesizing system as defined in claim 2, wherein ignoring procedures by subsampling and interpolation procedures of the interpolation unit are carried out for a continuous series of the plurality of dots on the screen.

8. An image synthesizing system as defined in claim 1, wherein in place of the rendering data storage unit, the image synthesizing system comprises a function computing unit for applying a function computation to the texture coordinates to determine the rendering data and wherein the image data forming unit reads said texture coordinates from said field buffer unit and the function computing unit determines the rendering data for forming the image data based on the read texture coordinates.

9. An image synthesizing system as defined in claim 8, wherein the subsampling unit does not ignore a dot on the polygon outline or on a boundary between adjacent polygons.

10. An image synthesizing system as defined in claim 9, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

11. An image synthesizing system as defined in claim 8, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

12. An image synthesizing system as defined in claim 8, wherein ignoring procedures by subsampling and interpolation procedures of the interpolation unit are carried out for a continuous series of the plurality of dots on the screen.

13. An image synthesizing system as defined in claim 1, wherein the rendering data stored in the rendering data storage unit includes color data and wherein said color data is read from the rendering data storage unit using said texture coordinates to form the image data.

14. An image synthesizing system as defined in claim 1, wherein the rendering data stored in the rendering data storage unit includes surface shape data and wherein said surface shape data is read from the rendering data storage unit using said texture coordinates to form the image data.

15. An image synthesizing system as defined in claim 1, wherein the interpolation unit linearly interpolates the texture coordinates of said dots adjacent to the ignored dot.

16. An image synthesizing system as defined in claim 1, wherein the subsampling unit does not ignore a dot on the polygon outline or on a boundary between adjacent polygons.

17. An image synthesizing system as defined in claim 16, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

18. An image synthesizing system as defined in claim 16, wherein ignoring procedures by subsampling and interpolation procedures of the interpolation unit are carried out for a continuous series of the plurality of dots on the screen.

19. An image synthesizing system as defined in claim 1, wherein dots not used to draw the polygon images are written in said field buffer unit as empty dots and polygon identification numbers for identifying the polygons are written in said field buffer unit, said interpolation unit performing said interpolation to a dot to be processed when the dot to be processed is an empty dot and dots adjacent to the empty dot have the same polygon identification number and are not empty dots.

20. An image synthesizing system as defined in claim 19 further comprising an attribute data storage unit for storing an attribute data which is image data common within each of polygons forming the three-dimensional image and wherein in response to the polygon identification number read out from the field buffer unit, the attribute data is read out from the attribute data storage unit to form the image data.

21. An image synthesizing system as defined in claim 19, wherein ignoring procedures by subsampling and interpolation procedures of the interpolation unit are carried out for a continuous series of the plurality of dots on the screen.

22. An image synthesizing system as defined in claim 1, wherein ignoring procedures by subsampling and interpolation procedures of the interpolation unit are carried out for a continuous series of the plurality of dots on the screen.

23. A method for perspective-transforming a three-dimensional image consisting of a plurality of polygons onto a projection plane to synthesize a pseudo three-dimensional image, said method comprising the steps of:

a determining step for determining positional coordinates of a plurality of dots for each of the polygons and a plurality of texture coordinates corresponding to the positional coordinates of each of said plurality of dots responsive to image data of vertices of the plurality of the polygons;

a storing step for storing said plurality of texture coordinates determined by said determining step in a field buffer unit at an address specified by said positional coordinates of each of said plurality of dots;

a reading step for reading said stored texture coordinates from said field buffer unit;

an image forming step for forming image data representative of the pseudo three-dimensional image by reading stored rendering data from a rendering data storage unit based on the texture coordinates read from said field buffer unit, said rendering data storage unit for storing rendering data at an address specified by said texture coordinates; and wherein said determining step comprises a computing step for computing positional coordinates of a plurality of subsampled dots and corresponding plurality of texture coordinates;

said image forming step comprises an interpolating step for interpolating texture coordinates of an ignored dot ignored by subsampling, based on the texture coordinates of dots adjacent to the ignored dot stored in said field buffer unit.

24. The method as defined in claim 23, wherein said determining step comprises a step for determining brightness data corresponding to the positional coordinates of each of said plurality of dots responsive to the image data of vertices of the plurality of polygons;

said storing step comprises a step for storing said brightness data determined by said determining step at an address in said field butter unit specified by said positional coordinates of each of said plurality of dots; and said interpolating step comprises a step for interpolating the brightness data of the ignored dot based on the brightness data of said dots adjacent to the ignored dot stored in said field buffer.

25. The method as defined in claim 23, further comprising an applying step for applying a function computation to the texture coordinates to determine the rendering data, wherein the image forming step reads said texture coordinates from the field buffer unit and the applying step determines the rendering data for forming the image data based on the read texture coordinates.

26. The method as defined in claim 23, wherein the computing step does not ignore a dot on the polygon outline or on a boundary between adjacent polygons.

27. The method as defined in claim 23, wherein dots not used to draw the polygon images are written in said field buffer unit as empty dots and polygon identification numbers for identifying the polygons are written in said field buffer unit, wherein the interpolating step comprises performing interpolation to a dot to be processed when the dot to be processed is an empty dot and dots adjacent to the empty dot have the same polygon identification number and are not empty dots.

28. The method as defined in claim 23, wherein the computing and interpolating steps are carried out for a continuous series of the plurality of dots on the screen.

* * * * *